(12) United States Patent
Maeda

(10) Patent No.: US 10,703,407 B2
(45) Date of Patent: Jul. 7, 2020

(54) STEERING CONTROL UNIT

(71) Applicant: JTEKT CORPORATION, Osaka-shi, Osaka (JP)

(72) Inventor: Shingo Maeda, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 331 days.

(21) Appl. No.: 15/938,651

(22) Filed: Mar. 28, 2018

(65) Prior Publication Data

US 2018/0281851 A1     Oct. 4, 2018

(30) Foreign Application Priority Data

Apr. 3, 2017   (JP) ................... 2017-073673

(51) Int. Cl.
  B62D 6/10   (2006.01)
  B62D 5/04   (2006.01)
(52) U.S. Cl.
  CPC .............. B62D 6/10 (2013.01); B62D 5/0463 (2013.01); B62D 5/0469 (2013.01); B62D 5/0493 (2013.01)
(58) Field of Classification Search
  CPC ...... B62D 6/10; B62D 5/0463; B62D 5/0469; B62D 5/0493
  USPC ........................................................... 701/41
  See application file for complete search history.

(56) References Cited

U.S. PATENT DOCUMENTS

2013/0261894 A1*  10/2013  Kojima ................ B62D 5/0463
                                                            701/41
2014/0343789 A1   11/2014  Maeda et al.
2016/0229447 A1*   8/2016  Wada .................... B62D 6/007

FOREIGN PATENT DOCUMENTS

EP        2708445 A2    3/2014
EP        2803557 A2   11/2014
JP      2015-020506 A   2/2015
JP      2015-163498 A   9/2015

OTHER PUBLICATIONS

Sep. 12, 2018 extended Search Report issued in European Patent Application No. 18165384.1.

* cited by examiner

Primary Examiner — Marthe Y Marc-Coleman
(74) Attorney, Agent, or Firm — Oliff PLC

(57) ABSTRACT

When a steering angle reaches a first value close to a second value that defines a boundary of the maximum physical range of operation of a steering wheel, an ECU calculates a virtual end controlled variable that sharply increases a steering torque. The ECU calculates a second limit on the virtual end controlled variable and calculates a final limit (upper and lower limits) on an assist controlled variable by taking into account the second limit. When performing virtual end control, the ECU calculates the final limit on the assist controlled variable by using, as a first limit corresponding to the steering torque, a previous value held by upper and lower limit holders, instead of a present value calculated in accordance with the steering torque in a present calculation cycle.

6 Claims, 13 Drawing Sheets

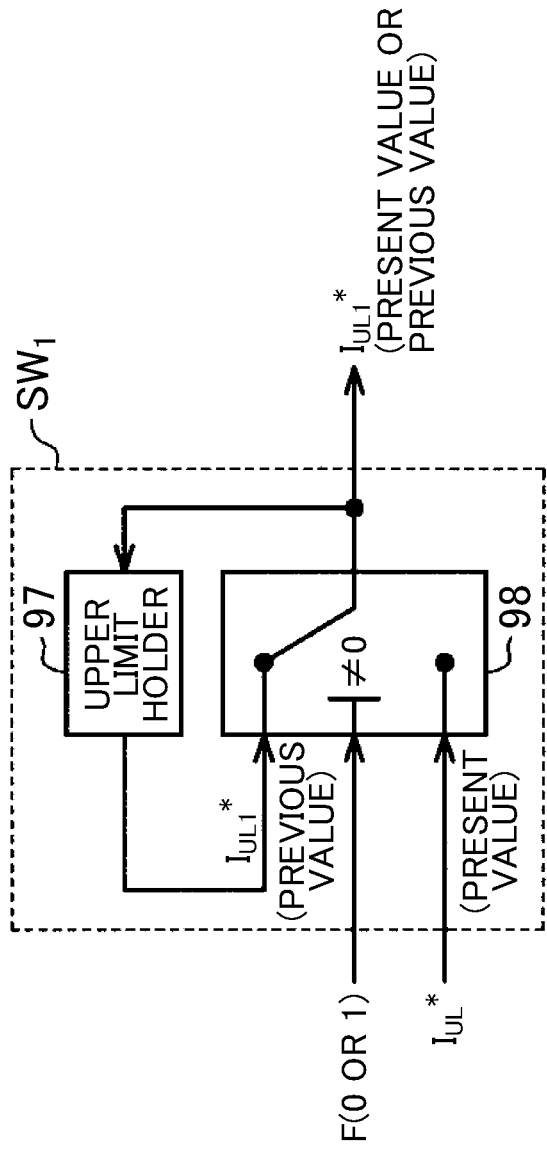
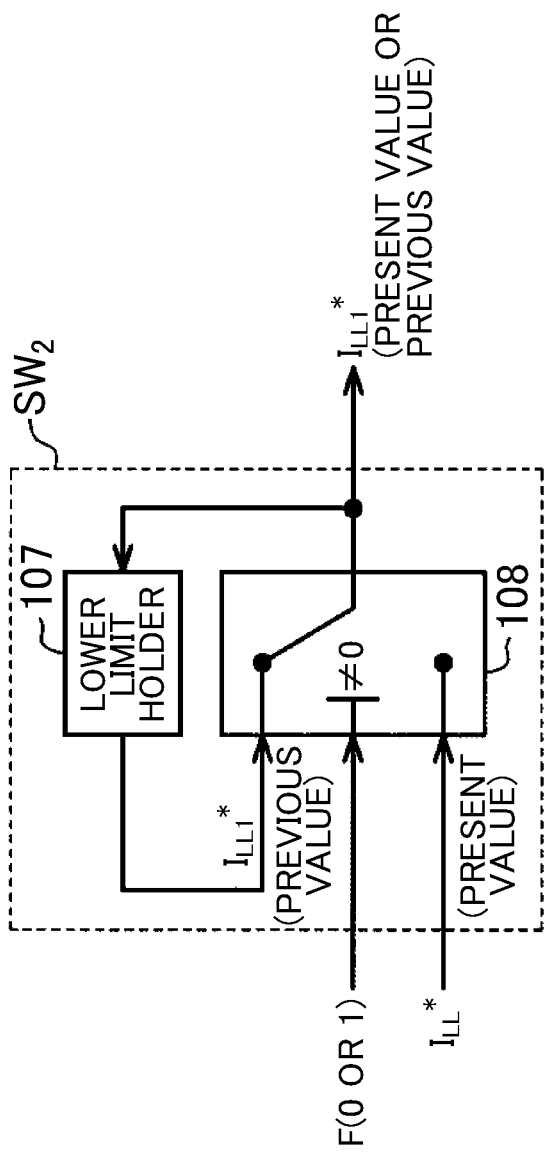
FIG. 6A
FIG. 6B

STEERING CONTROL UNIT

INCORPORATION BY REFERENCE

The disclosure of Japanese Patent Application No. 2017-073673 filed on Apr. 3, 2017 including the specification, drawings and abstract, is incorporated herein by reference in its entirety.

BACKGROUND OF THE INVENTION

1. Field of the Invention

The invention relates to a steering control unit.

2. Description of Related Art

Some types of electric power steering systems (EPS) supply a steering mechanism of a vehicle with the torque of a motor as an assist force. For example, a control unit of an EPS disclosed in Japanese Patent Application Publication No. 2015-163498 (JP 2015-163498 A) calculates an assist controlled variable on the basis of multiple kinds of state quantities indicating a steering operation state such as a steering torque and a steering angle, and controls power supply to a motor on the basis of the assist controlled variable. The control unit sets limits (upper and lower limits) individually for the state quantities. Each limit limits a variation range of the assist controlled variable in accordance with the corresponding state quantity. The control unit calculates and sets a final limit on the assist controlled variable by adding together the individually set limits. When the calculated assist controlled variable has an abnormal value, the abnormal assist controlled variable is limited by the final limit to an appropriate value in accordance with the state quantifies. Thus, the control unit of the EPS has a function to limit the abnormal assist controlled variable.

The EPS of JP 2015-163498 A uses a rack and pinion mechanism as a steering mechanism. The rack and pinion mechanism converts rotation of a pinion caused by the operation of a steering wheel to linear motion of a rack shaft in mesh with the pinion, thereby turning steered wheels. The rack shaft is slidably housed within a housing. It is common that when the rack shaft reaches the boundaries of its range of motion, an end of the rack shaft (a rack end) hits against the housing, thus causing a so-called "end hit" that physically limits the motion range of the rack shaft. Consequently, the operation range of the steering wheel is also limited.

Japanese Patent Application Publication No. 2015-20506 (JP 2015-20506 A) discloses an EPS that is configured not to cause the "end hit". In this EPS, when a steering angle reaches a threshold, a control unit calculates a correction quantity that corrects an assist controlled variable (a current command value) to sharply increase a steering reaction force. This correction quantity is opposite in sign to the assist controlled variable. Thus, the assist controlled variable and, by extension, the current supplied to a motor are sharply reduced or are reversed in sign, so that the steering reaction force increases sharply. This means that after the steering angle reaches the threshold, it is hard for a driver to operate a steering wheel in a direction that increases the absolute value of the steering angle. As such, the operation range of the steering wheel and, by extension, the motion range of the rack shaft are virtually formed. This makes it possible to virtually limit the operation range of the steering wheel to a range that is narrower than its original maximum operation range. Thus, this reduces the likelihood of the steering wheel being operated to the extent that the rack shaft reaches the boundaries of its actual physical range of motion.

The following may need to be considered when a control unit of an EPS is provided with both the function of JP 2015-163498 A to limit an abnormal assist controlled variable and the function of JP 2015-20506 A to virtually limit the operation range of a steering wheel. Performing the function to virtually limit the operation range of a steering wheel reduces the assist controlled variable. As a result, the current supplied to the motor is reduced, so that a detected steering torque is likely to have a larger value. This may excessively extend, relative to the assist controlled variable that is reduced through performance of the function to virtually limit the operation range of a steering wheel, the variation range of the assist controlled variable that is limited by the individual limit corresponding to the steering torque that is one of the state quantities indicating the steering operation state, and, by extension, the variation range of the assist controlled variable that is limited by the final limit that reflect the individual limit. Under this situation, if a calculated assist controlled variable is so excessive as to have an abnormal value, the abnormal assist controlled variable may be limited inappropriately.

SUMMARY OF THE INVENTION

A purpose of the invention is to provide a steering control unit for appropriately limiting an excessive assist controlled variable having an abnormal value.

According to an aspect of the invention, a steering control unit includes an assist controller, a correction controller, a limit calculator, and a limit processor. The assist controller calculates an assist controlled variable on the basis of multiple kinds of state quantities including a steering torque and a steering angle. The assist controlled variable is used to control power supply to a motor that generates an assist force to be supplied to a steering mechanism of a vehicle. When the steering angle reaches a first value close to a second value that defines a boundary of a physical range of operation of a steering wheel that is included in the steering mechanism, the correction controller performs correction control that calculates a correction quantity that corrects the assist controlled variable to sharply increase the steering torque. The limit calculator sets first limits individually for each of the state quantities. Each of the first limits is used to limit the variation range of the assist controlled variable in accordance with a corresponding one of the state quantities. The limit calculator calculates a final limit on the assist controlled variable by adding together all the first limits. The limit processor limits the variation range of the assist controlled variable on the basis of the final limit calculated by the limit calculator. The limit calculator sets a second limit that limits the correction quantity in accordance with the steering angle, and calculates the final limit by taking into account the second limit. When the correction control is performed, the limit calculator calculates the final limit by using the first limit that corresponds to the steering torque immediately before the correction control is performed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6A is a control block diagram of a switch provided in an upper limit calculator in the electronic control unit according to the first embodiment;

FIG. 6B is a control block diagram of a switch provided in a lower limit calculator in the electronic control unit according to the first embodiment;

DETAILED DESCRIPTION OF EMBODIMENTS

In a first embodiment described below, a steering control unit is embodied as an electronic control unit (ECU) of an electric power steering system.

Figure 1:
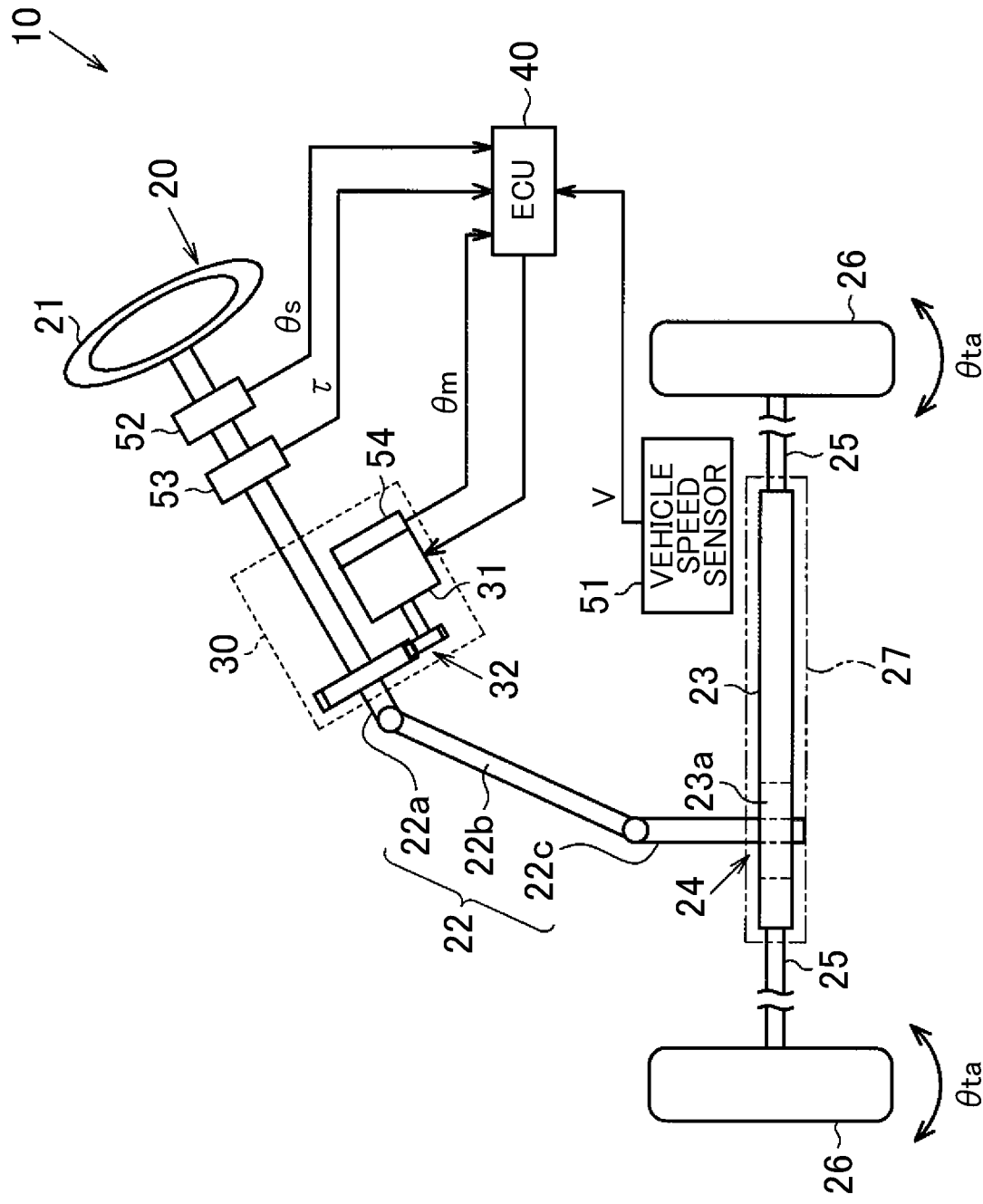
FIG. 1 is a schematic diagram illustrating the structure of an electric power steering system including an electronic control unit according to a first embodiment.

As illustrated in FIG. 1, an electric power steering system 10 includes a steering mechanism 20, a steering assist mechanism 30, and an ECU 40. The steering mechanism 20 steers steered wheels in response to a steering operation by a driver. The steering assist mechanism 30 assists a driver to perform the steering operation. The ECU 40 controls the operation of the steering assist mechanism 30.

The steering mechanism 20 includes a steering wheel 21 that is operated by a driver, and a steering shaft 22 that rotates together with the steering wheel 21. The steering shaft 22 includes a column shaft 22a, an intermediate shaft 22b, and a pinion shaft 22c. The column shaft 22a is coupled to the center of the steering wheel 21. The intermediate shaft 22b is coupled to the lower end of the column shaft 22a. The pinion shaft 22c is coupled to the lower end of the intermediate shaft 22b. The lower end of the pinion shaft 22c meshes with a rack shaft 23 (specifically, a portion 23a that has rack teeth) extending in a direction that intersects with the pinion shaft 22c. Thus, the pinion shaft 22c and the rack shaft 23 form a rack and pinion mechanism 24 that converts the rotation of the steering shaft 22 to the reciprocating linear motion of the rack shaft 23. The reciprocating linear motion is transmitted to right and left steered wheels 26 via tie rods 25 that are coupled to opposite ends of the rack shaft 23. Thus, a steered angle θta of each of the steered wheels 26 is changed.

As illustrated by a long dashed double-short dashed line in FIG. 1, the rack shaft 23 and the lower end of the pinion shaft 22c are housed within a housing 27. When the rack shaft 23 reaches the boundaries of its range of motion through the operation of the steering wheel 21, an end of the rack shaft 23 (a rack end) hits against the housing 27, causing a so-called "end hit". This physically limits the motion range of the rack shaft 23. Consequently, a range of operation of the steering wheel 21 is also limited.

As illustrated in FIG. 1, the steering assist mechanism 30 includes a motor 31 that generates a steering assist force. The motor 31 may be, for example, a three-phase brushless motor. The motor 31 is coupled to the column shaft 22a via a speed reducer 32. The speed reducer 32 decelerates the rotation of the motor 31 and transmits the decelerated rotational force to the column shaft 22a. As such, the torque of the motor 31 is supplied as the steering assist force (an assist force) to the steering shaft 22. This assists a driver to perform the steering operation.

The ECU 40 acquires detection results of various types of sensors mounted on a vehicle, thereby acquiring information indicating a command from a driver or a travelling state of the vehicle. The ECU 40 controls the motor 31 in accordance with the acquired various types of information.

Examples of the sensors include a vehicle speed sensor 51, a steering sensor 52, a torque sensor 53, and a rotation angle sensor 54. The vehicle speed sensor 51 detects a vehicle speed V (a travelling speed of the vehicle). The steering sensor 52 is mounted on the column shaft 22a and detects a steering angle θs. The torque sensor 53 is mounted on the column shaft 22a and detects a steering torque θs. The rotation angle sensor 54 is mounted on the motor 31 and detects a rotation angle θm of the motor 31.

The ECU 40 calculates a target assist force on the basis of the vehicle speed V, the steering angle θs, the steering torque τ, and the rotation angle θm, and supplies the motor 31 with driving electric power that causes the steering assist mechanism 30 to generate the target assist force.

Figure 2:
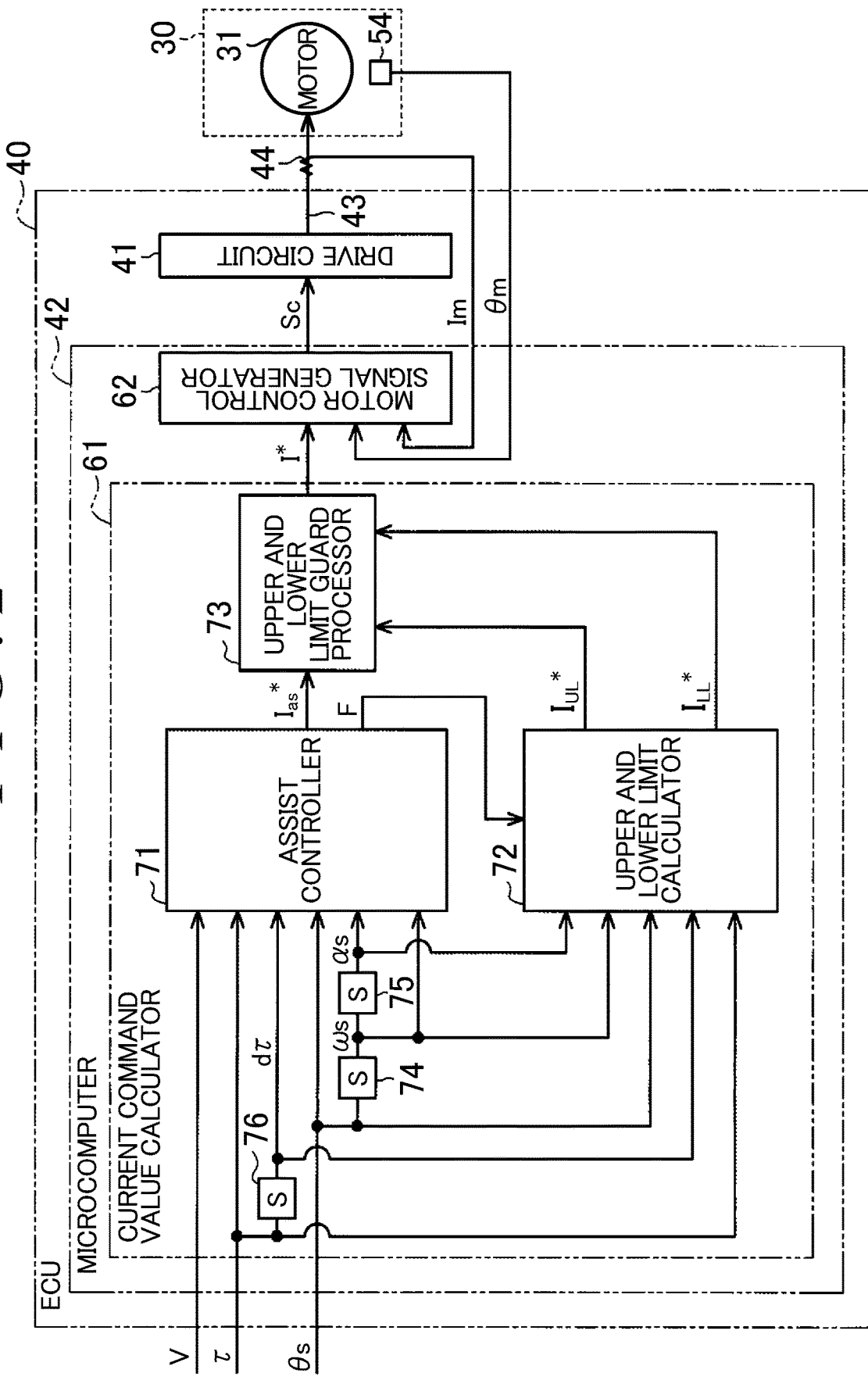
FIG. 2 is a control block diagram of the electronic control unit according to the first embodiment.

Next, the hardware structure of the ECU 40 is described. As illustrated in FIG. 2, the ECU 40 includes a drive circuit (an inverter circuit) 41 and a microcomputer 42.

The drive circuit 41 converts direct current (DC) power supplied from a DC power source, such as a battery, to three-phase alternating current (AC) power on the basis of a motor control signal Sc (a PWM drive signal) that is generated by the microcomputer 42. The converted three-phase AC power is supplied to the motor 31 via three-phase power supply lines 43. Each of the three-phase power supply lines 43 is provided with a current sensor 44. Each of the current sensors 44 detects an actual current value Im that is the amount of current actually flowing through the corresponding power supply line 43. In FIG. 2, for the purpose of brevity, the three-phase power supply lines 43 are collectively illustrated as one power supply line 43, and the three-phase current sensors 44 are collectively illustrated as one current sensor 44.

The microcomputer 42 acquires the detection results of the vehicle speed sensor 51, the steering sensor 52, the torque sensor 53, the rotation angle sensor 54, and the current sensors 44 in their respective predetermined sampling cycles. The microcomputer 42 generates the motor control signal Sc on the basis of the acquired detection results, namely, the vehicle speed V, the steering angle θs, the steering torque τ, the rotation angle θm, and the actual current values Im.

Next, the functional structure of the microcomputer 42 is described. The microcomputer 42 includes various calculation processing units that are implemented by execution of a control program stored in a memory device (not illustrated).

As illustrated in FIG. 2, the microcomputer 42 includes, as the calculation processing units, a current command value calculator 61 and a motor control signal generator 62. The current command value calculator 61 calculates a current command value I* on the basis of the steering torque τ, the vehicle speed V, and the steering angle θs. The current command value I* is a command value indicating the amount of current that needs to be supplied to the motor 31. Specifically, the current command value I* includes a q-axis current command value and a d-axis current command value in a d-q coordinate system. According to the first embodiment, the d-axis current command value is set to zero. The d-q coordinate system is a rotating coordinate system based on the rotation angle θm of the motor 31. The motor control signal generator 62 converts, by using the rotation angle θm, the three-phase current values Im of the motor 31 to two-phase vector components, i.e., a d-axis current value and a q-axis current value in the d-q coordinate system. The motor control signal generator 62 calculates a deviation between the d-axis current value and the d-axis current command value, calculates a deviation between the q-axis current value and the q-axis current command value, and generates the motor control signal Sc that eliminates the deviations.

Next, the current command value calculator 61 is described. As illustrated in FIG. 2, the current command value calculator 61 includes an assist controller 71, an upper and lower limit calculator 72, and an upper and lower limit guard processor 73. The current command value calculator 61 further includes three differentiators 74, 75, and 76. The differentiator 74 calculates a steering angular velocity ωs by differentiating the steering angle θs. The differentiator 75 is coupled to the output stage of the differentiator 74 and calculates a steering angular acceleration αs by differentiating the steering angular velocity ωs calculated by the differentiator 74. The differentiator 76 calculates a steering torque derivative value dτ by differentiating the steering torque τ with respect to time.

The assist controller 71 calculates an assist controlled variable $I_{as}^*$ on the basis of the steering torque τ, the vehicle speed V, the steering angle θs, the steering angular velocity ωs, the steering angular acceleration αs, and the steering torque derivative value dτ. The assist controlled variable $I_{as}^*$ is calculated to control power supply to the motor 31.

The assist controlled variable $I_{as}^*$ is a value (a current value) indicating the amount of current that needs to be supplied to the motor 31 to generate the target assist force having an appropriate magnitude in accordance with various state quantities.

The upper and lower limit calculator 72 calculates, as limits on the assist controlled variable $I_{as}^*$, an upper limit $I_{UL}^*$ and a lower limit $I_{LL}^*$ on the basis of various signals that are used in the assist controller 71, i.e., on the basis of the steering torque τ, the steering angle θs, the steering torque derivative value dτ, the steering angular velocity ωs, and the steering angular acceleration αs. The upper limit $I_{UL}^*$ and the lower limit $I_{LL}^*$ are final limits on the assist controlled variable $I_{as}^*$.

The upper and lower limit guard processor 73 performs limiting processing that limits the assist controlled variable $I_{as}^*$ on the basis of the upper limit $I_{UL}^*$ and the lower limit $I_{LL}^*$ that are calculated by the upper and lower limit calculator 72. Specifically, the upper and lower limit guard processor 73 compares the assist controlled variable $I_{as}^*$ with each of the upper limit $I_{UL}^*$ and the lower limit $I_{LL}^*$. The upper and lower limit guard processor 73 limits the assist controlled variable $I_{as}^*$ to the upper limit $I_{UL}^*$ when the assist controlled variable $I_{as}^*$ is greater than the upper limit $I_{UL}^*$, and limits the assist controlled variable $I_{as}^*$ to the lower limit $I_{LL}^*$ when the assist controlled variable $I_{as}^*$ is less than the lower limit $I_{LL}^*$. The assist controlled variable $I_{as}^*$ that has undergone the limiting processing is used as the final current command value I*. When the assist controlled variable $I_{as}^*$ is within the range from the upper limit $I_{UL}^*$ to the lower limit $I_{LL}^*$ inclusive, the assist controlled variable $I_{as}^*$ calculated by the assist controller 71 is used as the final current command value I* without any change.

Figure 3:
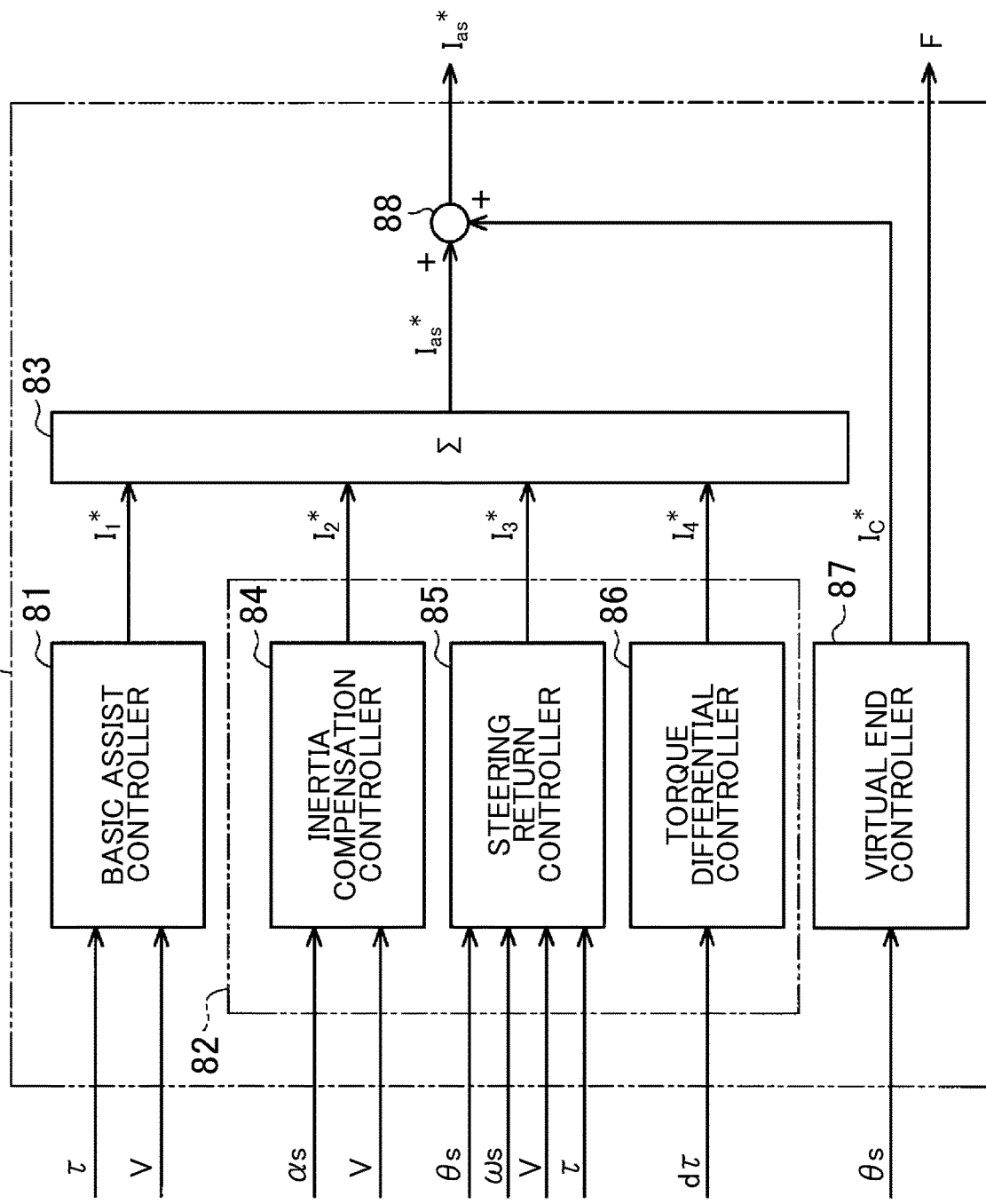
FIG. 3 is a control block diagram of an assist controller in the electronic control unit according to the first embodiment.

Next, the assist controller 71 is described in detail. As illustrated in FIG. 3, the assist controller 71 includes a basic assist controller 81, a compensation controller 82, and an adder 83. The assist controller 71 further includes a virtual end controller 87 and an adder 88.

The basic assist controller 81 calculates a basic assist controlled variable $I_1^*$ on the basis of the steering torque τ and the vehicle speed V. The basic assist controlled variable $I_1^*$ is a basic component (a current value) that is needed to generate the target assist force having an appropriate magnitude in accordance with the steering torque τ and the vehicle speed V. The basic assist controller 81 calculates the basic assist controlled variable $I_1^*$, for example, by using an assist characteristic map that is stored in a memory device (not illustrated) of the microcomputer 42. The assist characteristic map is a vehicle speed-sensitive three-dimensional map for calculating the basic assist controlled variable $I_1^*$ on the basis of the steering torque τ and the vehicle speed V. The assist characteristic map is set such that the calculated basic assist controlled variable $I_1^*$ becomes greater (in absolute value) as the steering torque τ becomes greater (in absolute value) and as the vehicle speed V becomes less.

The compensation controller 82 applies various compensation controls to the basic assist controlled variable $I_1^*$ to achieve a better steering feel. The compensation controller 82 includes an inertia compensation controller 84, a steering return controller 85, and a torque differential controller 86.

The inertia compensation controller 84 calculates a compensation quantity $I_2^*$ (a current value) for compensating for the inertia of the motor 31, on the basis of the steering angular acceleration αs and the vehicle speed V. The basic assist controlled variable $I_1^*$ is corrected by using the compensation quantity $I_2^*$. This correction reduces a drag feel (response delay) that is caused when the steering wheel 21 starts to be turned, and reduces a slip feel (overshoot) that is caused when the steering wheel 21 finishes being turned.

The steering return controller 85 calculates a compensation quantity $I_3^*$ (a current value) for compensating for return characteristics of the steering wheel 21, on the basis of the steering torque τ, the vehicle speed V, the steering angle θs, and the steering angular velocity ωs. Correcting the basic assist controlled variable $I_1^*$ by using the compensation quantity $I_3^*$ compensates for excess or deficiency of self-aligning torque due to a road reaction force. This is because the compensation quantity $I_3^*$ generates an assist force in a direction that causes the steering wheel 21 to return to its neutral position.

The torque differential controller 86 detects a reverse input vibration component as the steering torque derivative value dτ. The torque differential controller 86 calculates a compensation quantity $I_4^*$ (a current value) for compensating for disturbance, such as reverse input vibration, on the basis of the detected steering torque derivative value dτ. Correcting the basic assist controlled variable $I_1^*$ by using the compensation quantity $I_4^*$ suppresses disturbance, such as brake vibration that is caused when a brake is operated. This is because the compensation quantity $I_4^*$ generates an assist force in a direction that cancels the reverse input vibration.

The adder 83 adds the compensation quantity $I_2^*$, the compensation quantity $I_3^*$, and the compensation quantity $I_4^*$ to the basic assist controlled variable $I_1^*$ in order to correct the basic assist controlled variable $I_1^*$, thereby generating the assist controlled variable $I_{as}^*$. The virtual end controller 87 performs a so-called virtual end control when the steering wheel 21 is operated to a position that is close to the boundaries of a physical range of operation of the steering wheel 21. The virtual end control virtually limits the operation range of the steering wheel 21 to a range narrower than original maximum physical operation range of the steering wheel 21. Specifically, the virtual end control causes the motor 31 to sharply reduce generation of torque (an assist force) in the same direction as the steering wheel 21 is operated in, or causes the motor 31 to generate torque (steering reaction torque) in a direction opposite to the direction in which the steering wheel 21 is operated.

Specifically, when the steering angle θs reaches a first value close to a second value that defines the boundaries of the maximum physical range of operation of the steering wheel 21, the virtual end controller 87 calculates a virtual end controlled variable $I_c^*$ by using a virtual end map Me (refer to FIG. 4) that is stored in a memory device (not illustrated) of the microcomputer 42. The virtual end controlled variable $I_c^*$ is a correction quantity for correcting the original assist controlled variable $I_{as}^*$ calculated by the adder 83. The virtual end controlled variable $I_c^*$ is opposite in sign (positive or negative) to the steering angle θs.

The virtual end controller 87 sets a flag F to "1" when performing the virtual end control. The flag F indicates whether the virtual end control is performed. The virtual end controller 87 sets the flag F to "0" when not performing the virtual end control.

The adder 88 adds the virtual end controlled variable $I_c^*$ calculated by the virtual end controller 87 to the assist controlled variable $I_{as}^*$ calculated by the adder 83, thereby calculating the final assist controlled variable $I_{as}^*$. The virtual end controlled variable $I_c^*$ is opposite in sign to the steering angle θs and is therefore opposite in sign to the assist controlled variable $I_{as}^*$ (the basic assist controlled variable $I_1^*$). Thus, the final assist controlled variable $I_{as}^*$ is less than the absolute value of the original assist controlled variable $I_{as}^*$ calculated by the adder 83, or is opposite in sign to the original assist controlled variable $I_{as}^*$ calculated by the adder 83. As such, the assist force that is generated by the motor 31 decreases in accordance with the degree of reduction in the assist controlled variable $I_{as}^*$, or the motor 31 generates the steering reaction torque in accordance with the assist controlled variable $I_{as}^*$ that is opposite in sign to the original assist controlled variable $I_{as}^*$. This sharply increases the steering torque τ.

Figure 4:
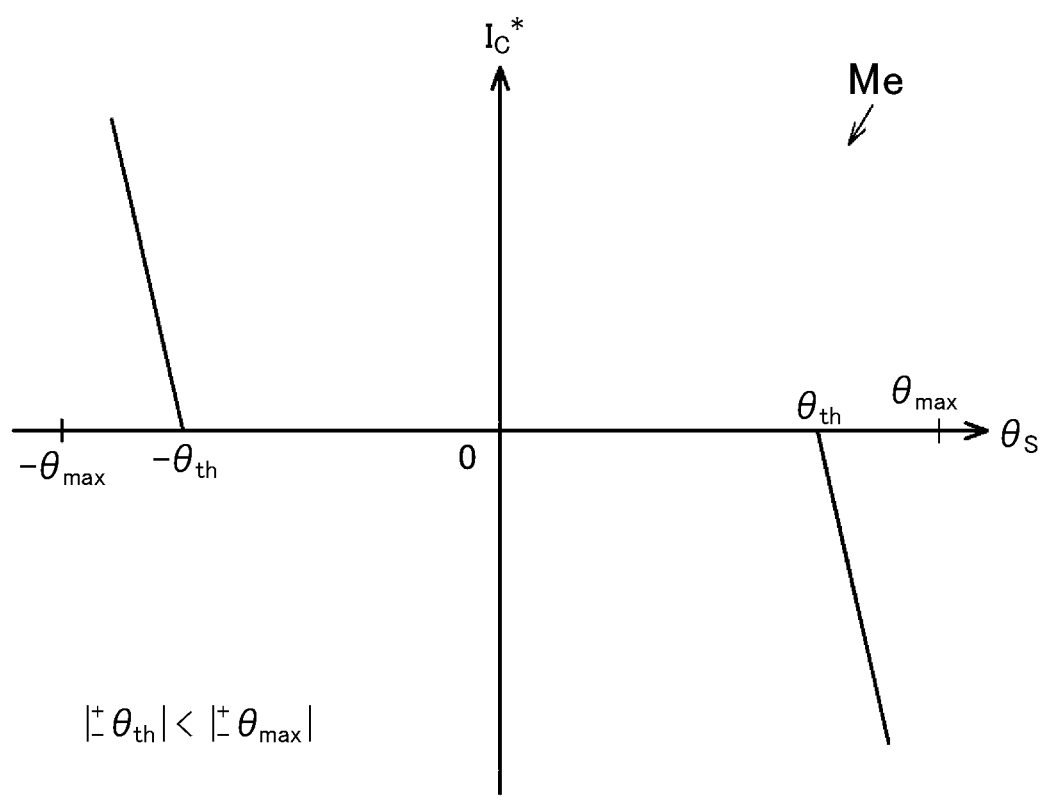
FIG. 4 is a map, used in the electronic control unit according to the first embodiment, illustrating an example of the relationship between a steering angle and a virtual end controlled variable.

Next, the virtual end map Me is described. As illustrated in FIG. 4, the virtual end map Me has a horizontal axis representing the steering angle θs and a vertical axis representing the virtual end controlled variable V, thus defining the relationship between the steering angle θs and the virtual end controlled variable $I_c^*$. The virtual end map Me has the following characteristics.

When the steering angle θs is positive and is less than a positive threshold angle $θ_{th}$, the virtual end controlled variable $I_c^*$ has a value of "0". When the steering angle θs is positive and is equal to or greater than the positive threshold angle $θ_{th}$, the virtual end controlled variable $I_c^*$ sharply increases in the negative direction with an increase in the steering angle θs.

When the steering angle θs is negative and has an absolute value that is less than the absolute value of a negative threshold angle $-θ_{th}$, the virtual end controlled variable $I_c^*$ has a value of "0". When the steering angle θs is negative and has an absolute value that is equal to or greater than the absolute value of the negative threshold angle $-θ_{th}$, the virtual end controlled variable $I_c^*$ increases sharply in the positive direction with an increase in the absolute value of the steering angle θs.

The positive and negative threshold angles $±θ_{th}$ are respectively set to values close to maximum steering angles $±θ_{max}$ that define the boundaries of the physical range of operation of the steering wheel 21. It is noted that the absolute values of the threshold angles $±θ_{th}$ are less than the absolute values of limit angles $±θ_{max}$.

Figure 5:
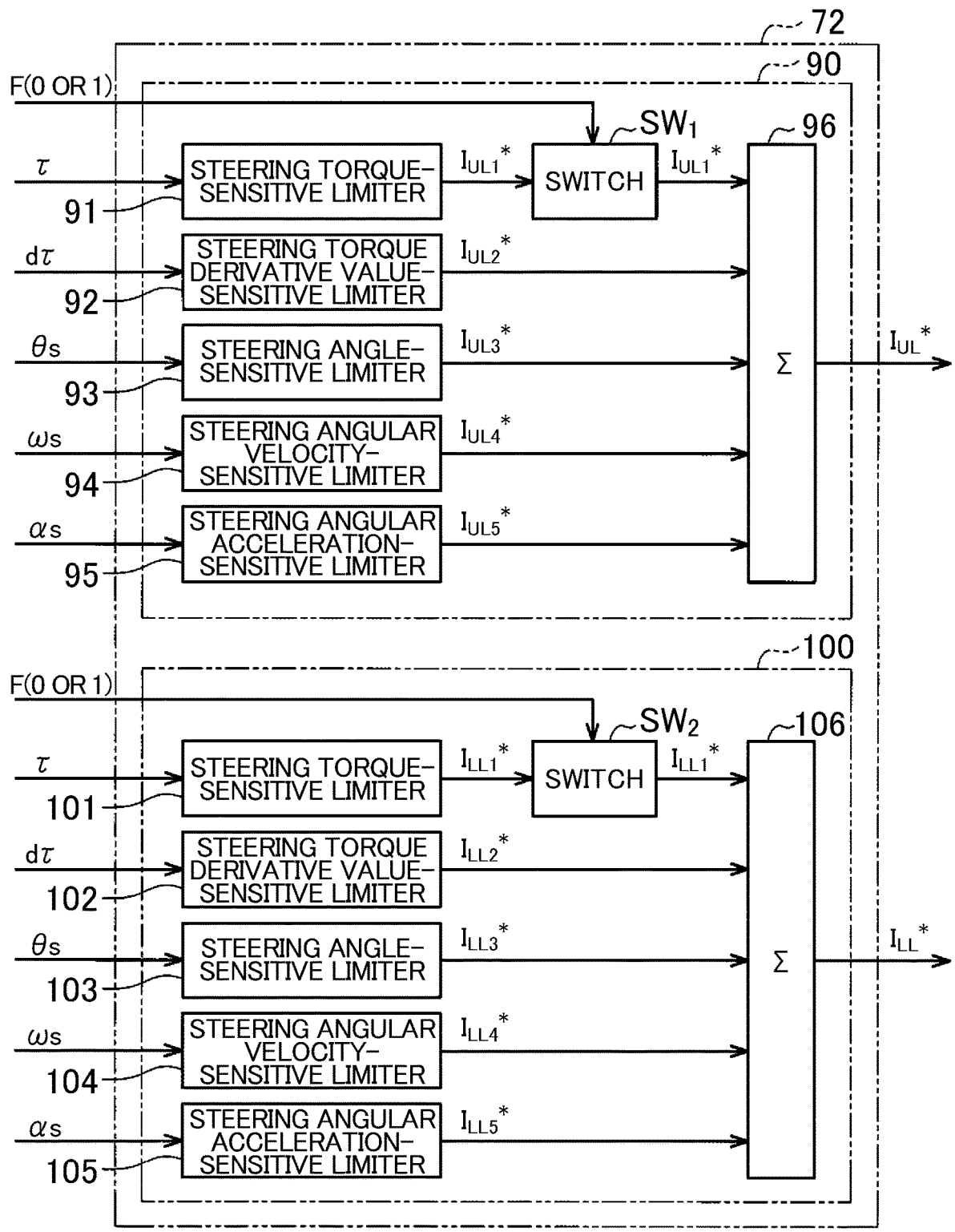
FIG. 5 is a control block diagram of an upper and lower limit calculator in the electronic control unit according to the first embodiment.

Next, the upper and lower limit calculator 72 is described in detail. As illustrated in FIG. 5, the upper and lower limit calculator 72 includes an upper limit calculator 90 and a lower limit calculator 100.

The upper limit calculator 90 includes a steering torque-sensitive limiter 91, a steering torque derivative value-sensitive limiter 92, a steering angle-sensitive limiter 93, a steering angular velocity-sensitive limiter 94, a steering angular acceleration-sensitive limiter 95, and an adder 96. The upper limit calculator 90 includes a switch $SW_1$.

The steering torque-sensitive limiter 91 calculates an upper limit $I_{UL1}^*$ on the assist controlled variable $I_{as}^*$ in accordance with the steering torque τ. The steering torque derivative value-sensitive limiter 92 calculates an upper limit $I_{UL2}^*$ on the assist controlled variable $I_{as}^*$ in accordance with the steering torque derivative value dτ. The steering angle-sensitive limiter 93 calculates an upper limit $I_{UL3}^*$ on the assist controlled variable $I_{as}^*$ in accordance with the steering angle θs. The steering angular velocity-sensitive limiter 94 calculates an upper limit $I_{UL4}^*$ on the assist controlled variable $I_{as}^*$ in accordance with the steering angular velocity ωs. The steering angular acceleration-sensitive limiter 95 calculates an upper limit $I_{UL5}^*$ on the assist controlled variable $I_{as}^*$ in accordance with the steering angular acceleration αs.

The adder 96 adds together the five upper limits $I_{UL1}^*$, $I_{UL2}^*$, $I_{UL3}^*$, $I_{UL4}^*$, and $I_{UL5}^*$, thereby generating the final upper limit $I_{UL}^*$ on the assist controlled variable $I_{as}^*$. The switch $SW_1$ is provided in a calculation path between the steering torque-sensitive limiter 91 and the adder 96. The upper limit $I_{UL1}*$ calculated by the steering torque-sensitive limiter 91 is fed to the adder 96 through the switch $SW_1$. The switch $SW_1$ switches the upper limit $I_{UL1}*$ to be fed to the adder 96 between a present value and a previous value in accordance with the value of the flag F. The present value refers to the upper limit $I_{UL1}*$ calculated in the present calculation cycle. The previous value refers to the upper limit $I_{UL1}*$ calculated in a previous calculation cycle one calculation cycle before the present calculation cycle.

The lower limit calculator 100 includes a steering torque-sensitive limiter 101, a steering torque derivative value-sensitive limiter 102, a steering angle-sensitive limiter 103, a steering angular velocity-sensitive limiter 104, a steering angular acceleration-sensitive limiter 105, and an adder 106. The lower limit calculator 100 includes a switch $SW_2$.

The steering torque-sensitive limiter 101 calculates a lower limit $I_{LL1}*$ on the assist controlled variable $I_{as}*$ in accordance with the steering torque τ. The steering torque derivative value-sensitive limiter 102 calculates a lower limit $I_{LL2}*$ on the assist controlled variable $I_{as}*$ in accordance with the steering torque derivative value dτ. The steering angle-sensitive limiter 103 calculates a lower limit $I_{LL3}*$ on the assist controlled variable $I_{as}*$ in accordance with the steering angle θs. The steering angular velocity-sensitive limiter 104 calculates a lower limit $I_{LL4}*$ on the assist controlled variable $I_{as}*$ in accordance with the steering angular velocity ωs. The steering angular acceleration-sensitive limiter 105 calculates a lower limit $I_{LL5}*$ on the assist controlled variable $I_{as}*$ in accordance with the steering angular acceleration αs.

The adder 106 adds together the five lower limits $I_{LL1}*$, $I_{LL2}*$, $I_{LL3}*$, $I_{LL4}*$, and $I_{LL5}*$, thereby generating the final lower limit $I_{LL}*$ on the assist controlled variable $I_{as}*$. The switch $SW_2$ is provided in a calculation path between the steering torque-sensitive limiter 101 and the adder 106. The lower limit $I_{LL1}*$ calculated by the steering torque-sensitive limiter 101 is fed to the adder 106 through the switch $SW_2$. The switch $SW_2$ switches the lower limit $I_{LL1}*$ to be fed to the adder 106 between a present value and a previous value in accordance with the value of the flag F. The present value refers to the lower limit $I_{LL1}*$ calculated in the present calculation cycle. The previous value refers to the lower limit $I_{LL1}*$ calculated in a previous calculation cycle one calculation cycle before the present calculation cycle.

Next, the switches $SW_1$ and $SW_2$ are described in detail. As illustrated in FIG. 6A, the switch $SW_1$ includes an upper limit holder 97 and an upper limit switcher 98. The upper limit $I_{UL1}*$ calculated by the steering torque-sensitive limiter 91 is fed to the adder 96 through the upper limit switcher 98.

The upper limit holder 97 receives the upper limit $I_{UL1}*$ that is fed from the upper limit switcher 98 to the adder 96, and holds the received upper limit $I_{UL1}*$. The upper limit $I_{UL1}*$ held by the upper limit holder 97 is updated each time the upper limit $I_{UL1}*$ is fed to the adder 96. Thus, the upper limit $I_{UL1}*$ held by the upper limit holder 97 is the previous value (i.e., the upper limit $I_{UL1}*$ in the previous calculation cycle one calculation cycle before the present calculation cycle) that is previous to the upper limit $I_{UL1}*$ to be fed as the present value to the adder 96.

The upper limit switcher 98 receives, as data input, the upper limit $I_{UL1}*$ calculated by the steering torque-sensitive limiter 91, and the upper limit $I_{UL1}*$ held by the upper limit holder 97. The upper limit switcher 98 receives, as control input, the value of the flag F set by the virtual end controller 87. On the basis of the value of the flag F, the upper limit switcher 98 switches the upper limit $I_{UL1}*$ to be fed to the adder 96, between the upper limit $I_{UL1}*$ (the present value) calculated by the steering torque-sensitive limiter 91 and the upper limit $I_{UL1}*$ (the previous value) held by the upper limit holder 97. When the value of the flag F is "0", the upper limit switcher 98 feeds, to the adder 96, the upper limit $I_{UL1}*$ calculated by the steering torque-sensitive limiter 91. When the value of the flag F is "1" (technically speaking, when the value of the flag F is not "0"), the upper limit switcher 98 feeds, to the adder 96, the upper limit $I_{UL1}*$ held by the upper limit holder 97.

As illustrated in FIG. 6B, the switch $SW_2$ includes a lower limit holder 107 and a lower limit switcher 108. The lower limit $I_{LL1}*$ calculated by the steering torque-sensitive limiter 101 is fed to the adder 106 through the lower limit switcher 108.

The lower limit holder 107 receives the lower limit $I_{LL1}*$ that is fed from the lower limit switcher 108 to the adder 106, and holds the received lower limit $I_{LL1}*$. The lower limit $I_{LL1}*$ held by the lower limit holder 107 is updated each time the lower limit $I_{LL1}*$ is fed to the adder 106. Thus, the lower limit $I_{LL1}*$ held by the lower limit holder 107 is the previous value (i.e., the lower limit $I_{LL1}*$ in the previous calculation cycle one calculation cycle before the present calculation cycle) that is previous to the lower limit $I_{LL1}*$ to be fed as the present value to the adder 106.

The lower limit switcher 108 receives, as data input, the lower limit $I_{LL1}*$ calculated by the steering torque-sensitive limiter 101, and the lower limit $I_{LL1}*$ held by the lower limit holder 107. The lower limit switcher 108 receives, as control input, the value of the flag F set by the virtual end controller 87. On the basis of the value of the flag F, the lower limit switcher 108 switches the lower limit $I_{LL1}*$ to be fed to the adder 106, between the lower limit $I_{LL1}*$ (the present value) calculated by the steering torque-sensitive limiter 101 and the lower limit $I_{LL1}*$ (the previous value) held by the lower limit holder 107. When the value of the flag F is "0", the lower limit switcher 108 feeds, to the adder 106, the lower limit $I_{LL1}*$ calculated by the steering torque-sensitive limiter 101. When the value of the flag F is "1" (technically speaking, when the value of the flag F is not "0"), the lower limit switcher 108 feeds, to the adder 106, the lower limit $I_{LL1}*$ held by the lower limit holder 107.

Figure 7:
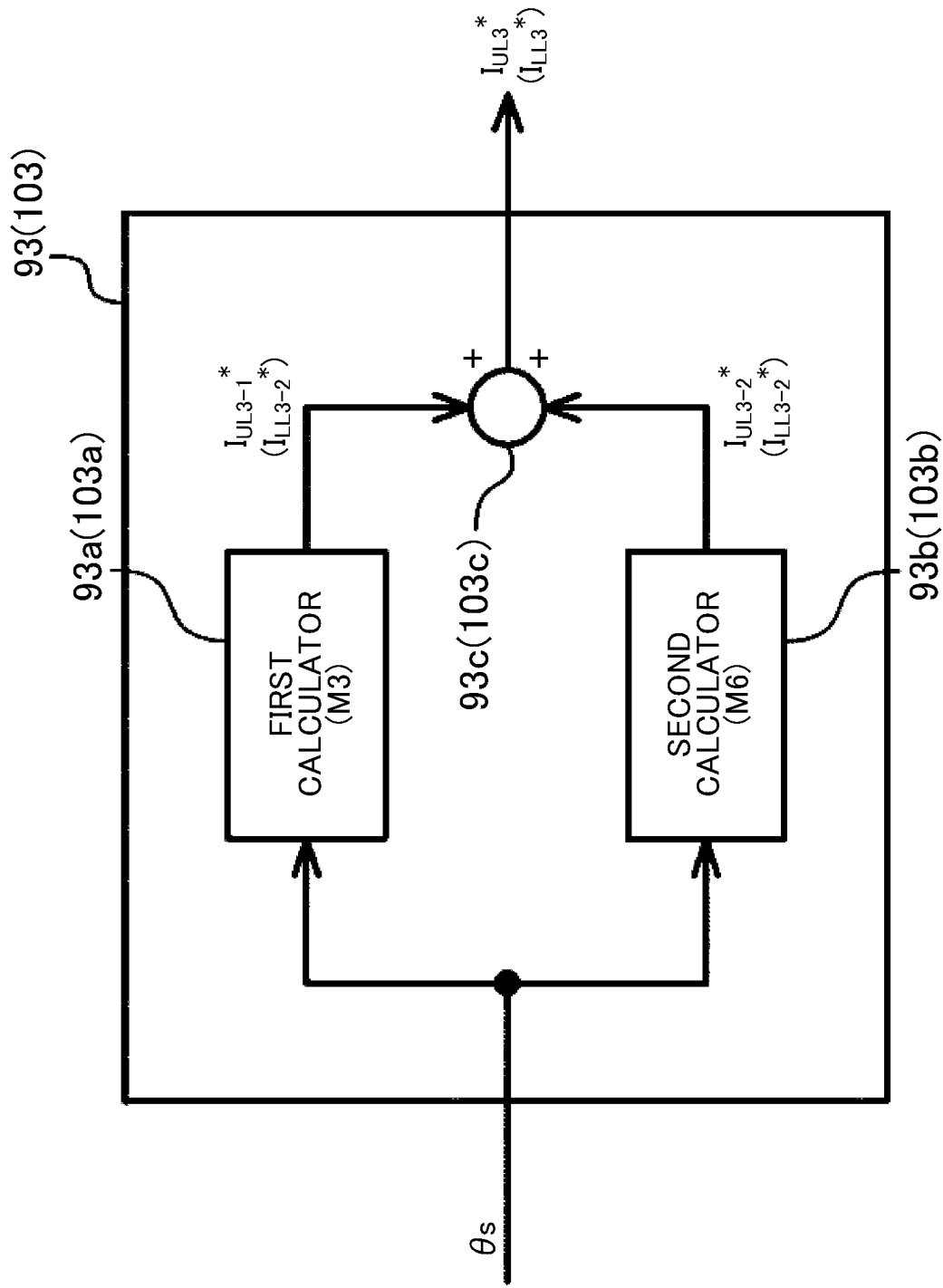
FIG. 7 is a control block diagram of a steering angle-sensitive limiter in the electronic control unit according to the first embodiment.

Next, the structures of the steering angle-sensitive limiters 93 and 103 are described in detail. As illustrated in FIG. 7, the steering angle-sensitive limiter 93 includes a first calculator 93a, a second calculator 93b, and an adder 93c. The first calculator 93a calculates an upper limit $I_{UL3-1}*$ on the assist controlled variable $I_{as}*$ in accordance with the steering angle θs. The second calculator 93b calculates an upper limit $I_{UL3-2}*$ on the virtual end controlled variable $I_c*$ in accordance with the steering angle θs. The adder 93c adds together the two upper limits $I_{UL3-1}*$ and $I_{UL3-2}*$, thereby calculating the final individual upper limit $I_{UL3}*$ in accordance with the steering angle θs.

The steering angle-sensitive limiter 103 has basically the same structure as the steering angle-sensitive limiter 93. Specifically, as denoted in FIG. 7 by reference numerals in parentheses, the steering angle-sensitive limiter 103 includes a first calculator 103a, a second calculator 103b, and an adder 103c. The first calculator 103a calculates a lower limit $I_{LL3-1}*$ on the assist controlled variable $I_{as}*$ in accordance with the steering angle θs. The second calculator 103b calculates a lower limit $I_{LL3-2}*$ on the virtual end controlled variable $I_c*$ in accordance with the steering angle θs. The adder 103c adds together the two lower limits $I_{LL3-1}*$ and $I_{LL3-2}*$, thereby calculating the final individual lower limit $I_{LL3}*$ in accordance with the steering angle θs.

The upper limit calculator 90 calculates the upper limits $I_{UL1}^*$ to $I_{UL5}^*$ by using first to sixth limit maps M1 to M6. The lower limit calculator 100 calculates the lower limits $I_{LL1}^*$ to $I_{LL5}^*$ by using the first to sixth limit maps M1 to M6. The first to sixth limit maps M1 to M6 are stored in a memory device (not illustrated) of the microcomputer 42. The first to fifth limit maps M1 to M5 are set such that the assist controlled variable $I_{as}^*$ calculated on the basis of the steering operation by a driver is allowed and such that an abnormal assist controlled variable $I_{as}^*$ caused by other factors is not allowed.

Figure 8:
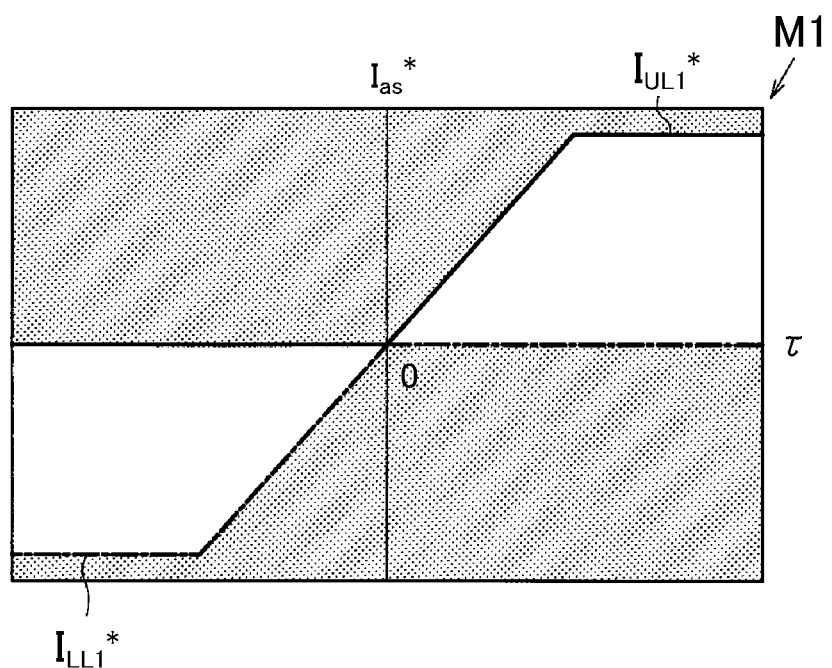
FIG. 8 is a map, used in the electronic control unit according to the first embodiment, illustrating an example of the relationship between a steering torque and limits.

As illustrated in FIG. 8, the first limit map M1 has a horizontal axis representing the steering torque $\tau$ and a vertical axis representing the assist controlled variable $I_{as}^*$. The first limit map M1 defines the relationship between the steering torque $\tau$ and the upper limit $I_{UL1}^*$ on the assist controlled variable $I_{as}^*$, and also defines the relationship between the steering torque $\tau$ and the lower limit $I_{LL1}^*$ on the assist controlled variable $I_{as}^*$. Using the first limit map M1, the steering torque-sensitive limiters 91 and 101 respectively calculate the upper limit $I_{UL1}^*$ and the lower limit $I_{LL1}^*$ in accordance with the steering torque $\tau$.

The first limit map M1 is set such that the assist controlled variable $I_{as}^*$ having the same sign (positive or negative) as that of the steering torque $\tau$ is allowed and such that the assist controlled variable $I_{as}^*$ opposite in sign to the steering torque $\tau$ is not allowed. Thus, the first limit map M1 has the following characteristics. When the steering torque $\tau$ has a positive value, the upper limit $I_{UL1}^*$ on the assist controlled variable $I_{as}^*$ increases in the positive direction with an increase in the steering torque $\tau$, and is maintained at a constant positive value after the steering torque $\tau$ exceeds a predetermined value. When the steering torque $\tau$ has a positive value, the lower limit $I_{LL1}^*$ on the assist controlled variable $I_{as}^*$ is maintained at "0". In contrast, when the steering torque $\tau$ has a negative value, the upper limit $I_{UL1}^*$ on the assist controlled variable $I_{as}^*$ is maintained at "0". When the steering torque $\tau$ has a negative value, the lower limit $I_{LL1}^*$ on the assist controlled variable $I_{as}^*$ increases in the negative direction with an increase in the absolute value of the steering torque $\tau$, and is maintained at a constant negative value after the absolute value of the steering torque $\tau$ exceeds a predetermined value.

Figure 9:
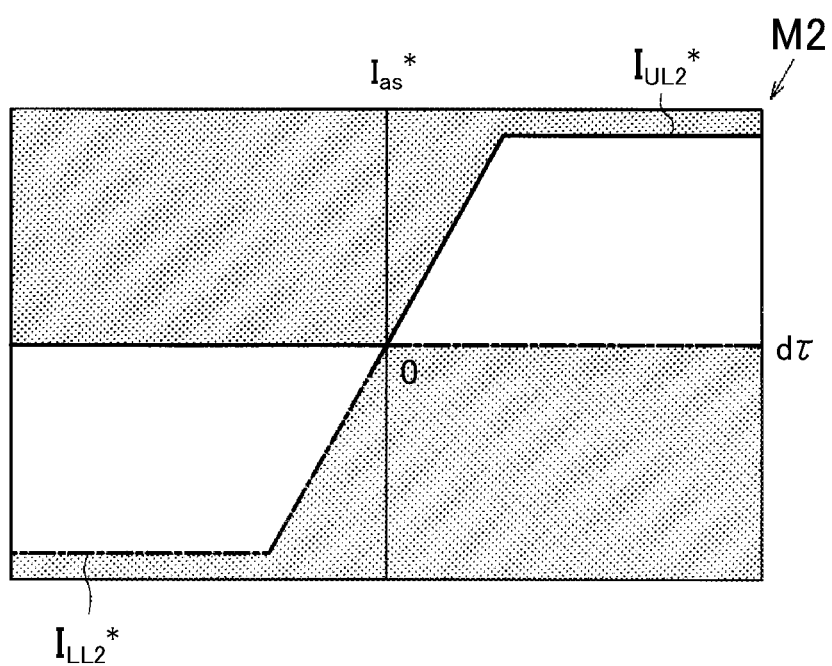
FIG. 9 is a map, used in the electronic control unit according to the first embodiment, illustrating an example of the relationship between a derivative of the steering torque and limits.

As illustrated in FIG. 9, the second limit map M2 has a horizontal axis representing the steering torque derivative value d$\tau$ and a vertical axis representing the assist controlled variable $I_{as}^*$. The second limit map M2 defines the relationship between the steering torque derivative value d$\tau$ and the upper limit $I_{UL2}^*$ on the assist controlled variable $I_{as}^*$, and also defines the relationship between the steering torque derivative value d$\tau$ and the lower limit $I_{LL2}^*$ on the assist controlled variable $I_{as}^*$. Using the second limit map M2, the steering torque derivative value-sensitive limiters 92 and 102 respectively calculate the upper limit $I_{UL2}^*$ and the lower limit $I_{LL2}^*$ in accordance with the steering torque derivative value d$\tau$.

The second limit map M2 is set such that the assist controlled variable $I_{as}^*$ having the same sign (positive or negative) as that of the steering torque derivative value d$\tau$ is allowed and such that the assist controlled variable $I_{as}^*$ opposite in sign to the steering torque derivative value d$\tau$ is not allowed. Thus, the second limit map M2 has the following characteristics. When the steering torque derivative value d$\tau$ has a positive value, the upper limit $I_{UL2}^*$ on the assist controlled variable $I_{as}^*$ increases in the positive direction with an increase in the steering torque derivative value d$\tau$, and is maintained at a constant positive value after the steering torque derivative value d$\tau$ exceeds a predetermined value. When the steering torque derivative value d$\tau$ has a positive value, the lower limit $I_{LL2}^*$ on the assist controlled variable $I_{as}^*$ is maintained at "0". In contrast, when the steering torque derivative value d$\tau$ has a negative value, the upper limit $I_{UL2}^*$ on the assist controlled variable $I_{as}^*$ is maintained at "0". When the steering torque derivative value d$\tau$ has a negative value, the lower limit $I_{LL2}^*$ on the assist controlled variable $I_{as}^*$ increases in the negative direction with an increase in the absolute value of the steering torque derivative value d$\tau$, and is maintained at a constant negative value after the absolute value of the steering torque derivative value d$\tau$ exceeds a predetermined value.

Figure 10:
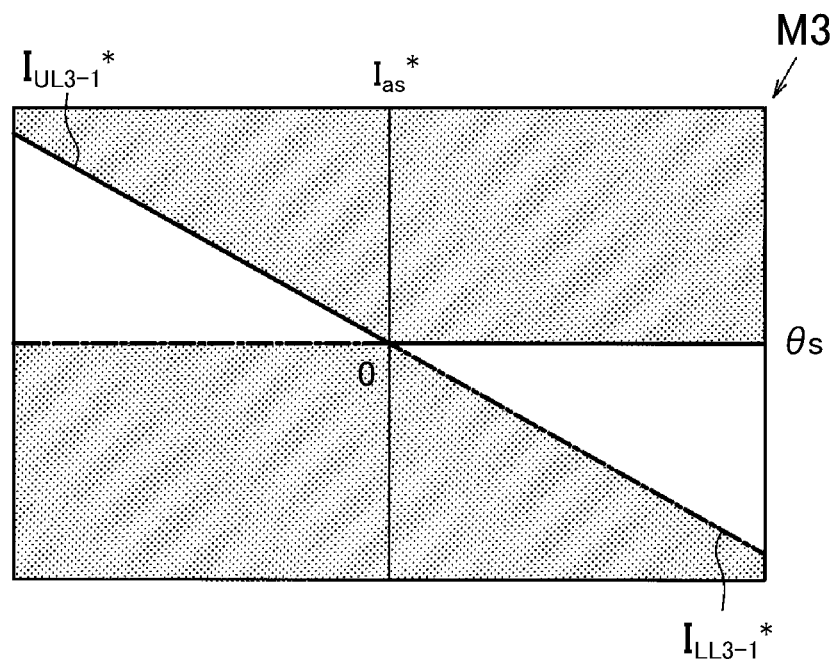
FIG. 10 is a map, used in the electronic control unit according to the first embodiment, illustrating an example of the relationship between the steering angle and limits.

As illustrated in FIG. 10, the third limit map M3 has a horizontal axis representing the steering angle $\theta$s and a vertical axis representing the assist controlled variable $I_{as}^*$. The third limit map M3 defines the relationship between the steering angle $\theta$s and the upper limit $I_{UL3-1}^*$ on the assist controlled variable $I_{as}^*$, and also defines the relationship between the steering angle $\theta$s and the lower limit $I_{LL3-1}^*$ on the assist controlled variable $I_{as}^*$. Using the third limit map M3, the steering angle-sensitive limiters 93 and 103 (technically speaking, the first calculators 93a and 103a) respectively calculate the upper limit $I_{UL3-1}^*$ and the lower limit $I_{LL3-1}^*$ in accordance with the steering angle $\theta$s.

The third limit map M3 is set such that the assist controlled variable $I_{as}^*$ opposite in sign (positive or negative) to the steering angle $\theta$s is allowed and such that the assist controlled variable $I_{as}^*$ having the same sign as that of the steering angle $\theta$s is not allowed. Thus, the third limit map M3 has the following characteristics. When the steering angle $\theta$s has a positive value, the upper limit $I_{UL3-1}^*$ on the assist controlled variable $I_{as}^*$ is maintained at "0". When the steering angle $\theta$s has a positive value, the lower limit $I_{LL3-1}^*$ on the assist controlled variable $I_{as}^*$ increases in the negative direction with an increase in the steering angle $\theta$s. When the steering angle $\theta$s has a negative value, the upper limit $I_{UL3-1}^*$ on the assist controlled variable $I_{as}^*$ increases in the positive direction with an increase in the absolute value of the steering angle $\theta$s. When the steering angle $\theta$s has a negative value, the lower limit $I_{LL3-1}^*$ on the assist controlled variable $I_{as}^*$ is maintained at "0".

Figure 11:
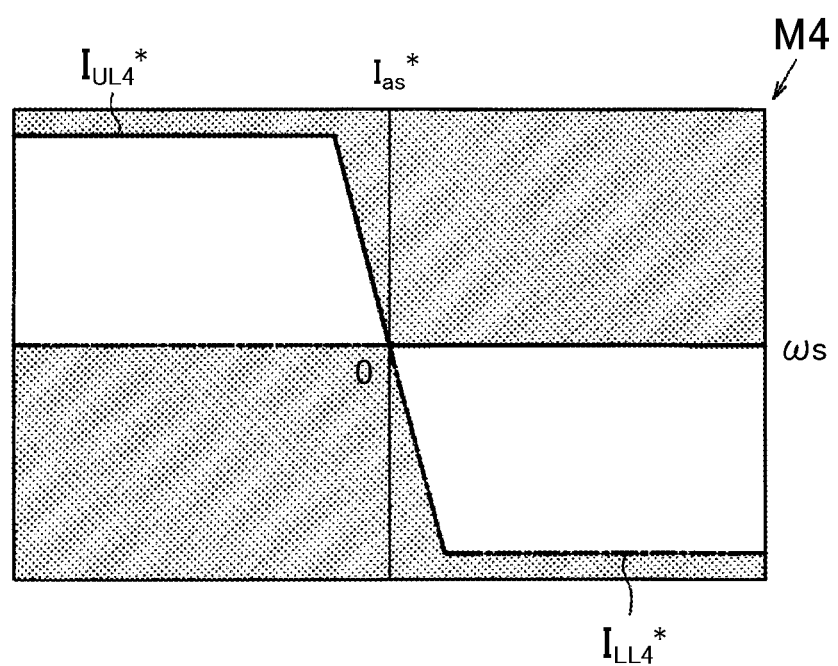
FIG. 11 is a map, used in the electronic control unit according to the first embodiment, illustrating an example of the relationship between a steering angular velocity and limits.

As illustrated in FIG. 11, the fourth limit map M4 has a horizontal axis representing the steering angular velocity $\omega$s and a vertical axis representing the assist controlled variable $I_{as}^*$. The fourth limit map M4 defines the relationship between the steering angular velocity $\omega$s and the upper limit $I_{UL4}^*$ on the assist controlled variable $I_{as}^*$, and also defines the relationship between the steering angular velocity $\omega$s and the lower limit $I_{LL4}^*$ on the assist controlled variable $I_{as}^*$. Using the fourth limit map M4, the steering angular velocity-sensitive limiters 94 and 104 respectively calculate the upper limit $I_{UL4}^*$ and the lower limit $I_{LL4}^*$ in accordance with the steering angular velocity $\omega$s.

The fourth limit map M4 is set such that the assist controlled variable $I_{as}^*$ opposite in sign (positive or negative) to the steering angular velocity $\omega$s is allowed and such that the assist controlled variable $I_{as}^*$ having the same sign as that of the steering angular velocity $\omega$s is not allowed. Thus, the fourth limit map M4 has the following characteristics. When the steering angular velocity $\omega$s has a positive value, the upper limit $I_{UL4}^*$ on the assist controlled variable $I_{as}^*$ is maintained at "0". When the steering angular velocity $\omega$s has a positive value, the lower limit $I_{LL4}^*$ on the assist controlled variable $I_{as}^*$ increases in the negative direction with an increase in the steering angular velocity $\omega$s, and is maintained at a constant negative value after the steering angular velocity ωs exceeds a predetermined value. In contrast, when the steering angular velocity ωs has a negative value, the upper limit $I_{UL4}^*$ on the assist controlled variable $I_{as}^*$ increases in the positive direction with an increase in the absolute value of the steering angular velocity ωs, and is maintained at a constant positive value after the absolute value of the steering angular velocity ωs exceeds a predetermined value. When the steering angular velocity ωs has a negative value, the lower limit $I_{LL4}^*$ on the assist controlled variable $I_{as}^*$ is maintained at "0".

Figure 12:
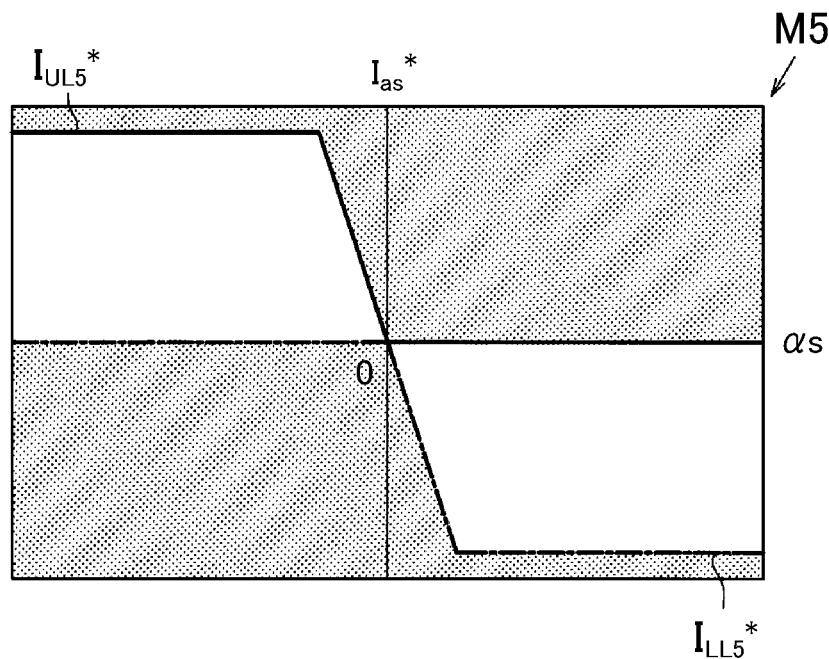
FIG. 12 is a map, used in the electronic control unit according to the first embodiment, illustrating an example of the relationship between a steering angular acceleration and limits.

As illustrated in FIG. 12, the fifth limit map M5 has a horizontal axis representing the steering angular acceleration αs and a vertical axis representing the assist controlled variable $I_{as}^*$. The fifth limit map M5 defines the relationship between the steering angular acceleration αs and the upper limit $I_{UL5}^*$ on the assist controlled variable $I_{as}^*$, and also defines the relationship between the steering angular acceleration αs and the lower limit $I_{LL5}^*$ on the assist controlled variable $I_{as}^*$. Using the fifth limit map M5, the steering angular acceleration-sensitive limiters 95 and 105 respectively calculate the upper limit $I_{UL5}^*$ and the lower limit $I_{LL5}^*$ in accordance with the steering angular acceleration αs.

The fifth limit map M5 is set such that the assist controlled variable $I_{as}^*$ opposite in sign (positive or negative) to the steering angular acceleration αs is allowed and such that the assist controlled variable $I_{as}^*$ having the same sign as that of the steering angular acceleration αs is not allowed. Thus, the fifth limit map M5 has the following characteristics. When the steering angular acceleration αs has a positive value, the upper limit $I_{UL5}^*$ on the assist controlled variable $I_{as}^*$ is maintained at "0". When the steering angular acceleration αs has a positive value, the lower limit $I_{LL5}^*$ on the assist controlled variable $I_{as}^*$ increases in the negative direction with an increase in the steering angular acceleration αs, and is maintained at a constant negative value after the steering angular acceleration αs exceeds a predetermined value. In contrast, when the steering angular acceleration αs has a negative value, the upper limit $I_{UL5}^*$ on the assist controlled variable $I_{as}^*$ increases in the positive direction with an increase in the absolute value of the steering angular acceleration αs, and is maintained at a constant positive value after the absolute value of the steering angular acceleration αs exceeds a predetermined value. When the steering angular acceleration αs has a negative value, the lower limit $I_{LL5}^*$ on the assist controlled variable $I_{as}^*$ is maintained at "0".

Figure 13:
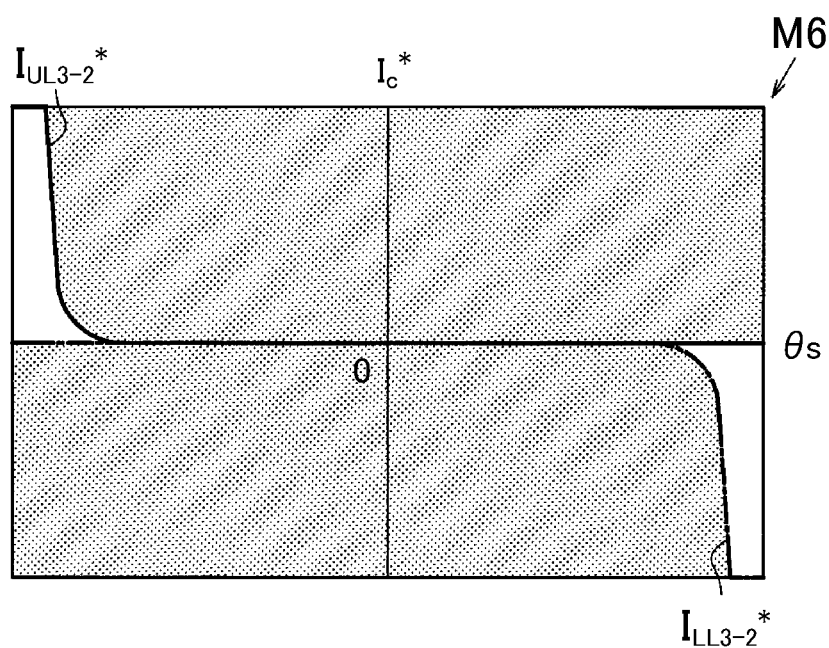
FIG. 13 is a map, used in the electronic control unit according to the first embodiment, illustrating an example of the relationship between the steering angle and limits of a virtual end controlled variable.

As illustrated in FIG. 13, the sixth limit map M6 has a horizontal axis representing the steering angle θs and a vertical axis representing the virtual end controlled variable $I_c^*$. The sixth limit map M6 defines the relationship between the steering angle θs and the upper limit $I_{UL3-2}^*$ on the virtual end controlled variable $I_c^*$, and also defines the relationship between the steering angle θs and the lower limit $I_{LL3-2}^*$ on the virtual end controlled variable $I_c^*$. Using the sixth limit map M6, the steering angle-sensitive limiters 93 and 103 (technically speaking, the second calculators 93b and 103b) respectively calculate the upper limit $I_{UL3-2}^*$ and the lower limit $I_{LL3-2}^*$ in accordance with the steering angle θs.

The sixth limit map M6 is set such that the virtual end controlled variable $I_c^*$ calculated on the basis of the virtual end map Me illustrated by the graph in FIG. 4 is allowed and such that an abnormal virtual end controlled variable $I_c^*$ caused by other factors is not allowed. The sixth limit map M6 is set such that the virtual end controlled variable $I_c^*$ opposite in sign (positive or negative) to the steering angle θs is allowed and such that the virtual end controlled variable $I_c^*$ having the same sign as that of the steering angle θs is not allowed. The sixth limit map M6 has the following characteristics.

When the steering angle θs has a positive value, the upper limit $I_{UL3-2}^*$ on the virtual end controlled variable $I_c^*$ is maintained at "0". When the steering angle θs has a positive value that is less than a predetermined positive value, the lower limit $I_{LL3-2}^*$ on the virtual end controlled variable $I_c^*$ is maintained at "0". When the steering angle θs has a positive value that is equal to or greater than the predetermined positive value, the lower limit $I_{LL3-2}^*$ on the virtual end controlled variable $I_c^*$ increases sharply in the negative direction with an increase in the steering angle θs.

In contrast, when the steering angle θs is negative and has an absolute value that is less than the absolute value of a predetermined negative value, the upper limit $I_{UL3-2}^*$ on the virtual end controlled variable $I_c^*$ is maintained at "0". When the steering angle θs is negative and has an absolute value that is greater than or equal to the absolute value of the predetermined negative value, the upper limit $I_{UL3-2}^*$ on the virtual end controlled variable $I_c^*$ increases sharply in the positive direction with an increase in the absolute value of the steering angle θs. When the steering angle θs has a negative value, the lower limit $I_{LL3-2}^*$ on the virtual end controlled variable $I_c^*$ is maintained at "0".

For example, the predetermined positive and negative values of the sixth limit map M6 may be respectively set to values close to the positive and negative threshold angles $\pm\theta_{th}$. The predetermined positive value is less than the positive threshold angle $\theta_{th}$, and the absolute value of the predetermined negative value is less than the absolute value of the negative threshold angle $-\theta_{th}$. Next, the basic operation and effect of the ECU 40 are described. First, the operation and effect of the ECU 40 when the ECU 40 is not performing the virtual end control are described.

The limits (the upper and lower limits) on the assist controlled variable $I_{as}^*$ are set for each of the signals that are used to calculate the assist controlled variable $I_{as}^*$, i.e., the state quantities indicating the steering operation state, namely, the steering torque τ, the steering torque derivative value dτ, the steering angle θs, the steering angular velocity ωs, and the steering angular acceleration αs. When calculating the final current command value I* on the basis of the assist controlled variable $I_{as}^*$, the microcomputer 42 sets, for each of the signals, the limits that limit the variation range of the assist controlled variable $I_{as}^*$ in accordance with the values of the signals. The microcomputer 42 sets the sum of the limits ($I_{UL1}^*$ to $I_{UL5}^*$, $I_{LL1}^*$ to $I_{LL5}^*$) that are set for each of the signals, as final limits ($I_{UL}^*$, $I_{LL}^*$) on the assist controlled variable $I_{as}^*$.

The limits for each of the signals and, by extension, the final limits are set such that the normal assist controlled variable $I_{as}^*$ calculated on the basis of the steering operation by a driver is allowed and such that the abnormal assist controlled variable $I_{as}^*$ caused by other factors is not allowed. The microcomputer 42 allows the compensation quantities that are based on the compensation controls, such as the torque derivative control and the steering return control, for compensating for the steering input from a driver, but limits abnormal or erroneous outputs that exceed the compensation quantities.

When the assist controlled variable $I_{as}^*$ falls outside a limit range defined by the final upper limit $I_{UL}^*$ and the final lower limit $I_{LL}^*$, the microcomputer 42 limits the assist controlled variable $I_{as}^*$ such that the assist controlled variable $I_{as}^*$ greater than the upper limit $I_{UL}^*$ or the assist controlled variable $I_{as}^*$ less than the lower limit $I_{LL}^*$ is not supplied as the final current command value I* to the motor control signal generator 62. The individual limits (the upper and lower limits) that are set for each of the signals are reflected in the final upper limit $I_{UL}$* and the final lower limit $I_{LL}$*. That is, even when the calculated assist controlled variable $I_{as}$* has an abnormal value, the abnormal assist controlled variable $I_{as}$* is limited by the final limits to an appropriate value in accordance with the values of the signals. The appropriate assist controlled variable $I_{as}$* is supplied as the final current command value I* to the motor control signal generator 62, so that an appropriate assist force is supplied to the steering mechanism 20. Thus, even when the calculated assist controlled variable $I_{as}$* is so excessive as to have an abnormal value for some reasons, the likelihood is reduced that the final current command value I* based on the abnormal assist controlled variable $I_{as}$* is supplied to the motor control signal generator 62. This reduces the likelihood of an unexpected assist force being supplied to the steering mechanism 20. For example, the occurrence of so-called self-steering is reduced.

The assist controlled variable $I_{as}$* may remain limited until the assist controlled variable $I_{as}$* becomes normal. Alternatively, the following structure may be employed to improve safety.

Figure 14:
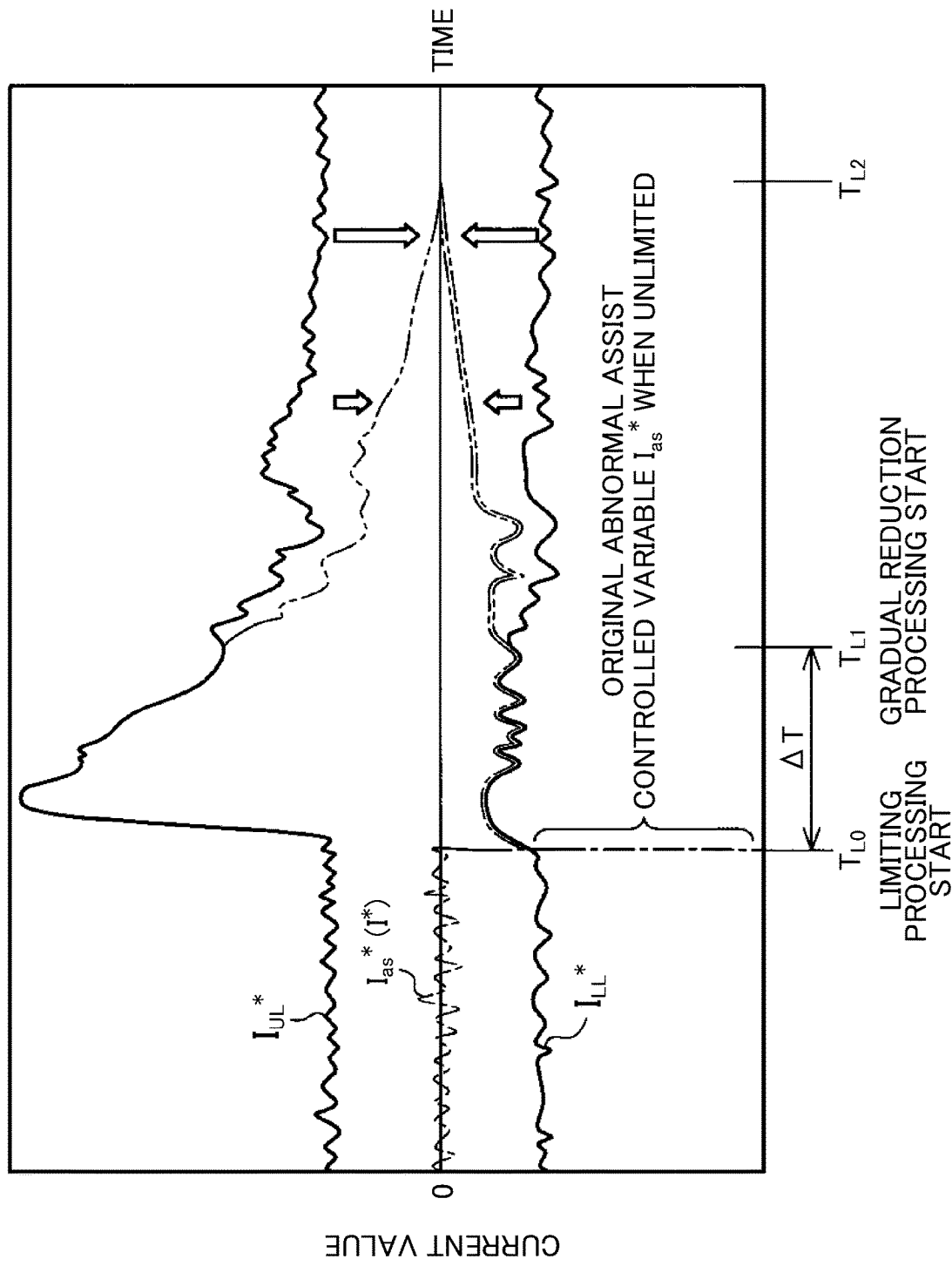
FIG. 14 is a graph illustrating an example of a change in an assist controlled variable (a current command value) that is calculated by the electronic control unit according to the first embodiment.

As illustrated by a graph in FIG. 14, for example, when the assist controlled variable $I_{as}$* is less than the lower limit $I_{LL}$* (at time $T_{L0}$), the assist controlled variable $I_{as}$* is limited to the lower limit $I_{LL}$*. When the assist controlled variable $I_{as}$* remains limited for a predetermined period ΔT (at time $T_{L1}$), the microcomputer 42 performs processing (hereinafter referred to as gradual reduction processing) that gradually reduces the lower limit $I_{LL}$* to "0". The assist controlled variable $I_{as}$* becomes "0" at the same time (at time $T_{L2}$) as the lower limit $I_{LL}$* becomes "0". As a result, the supply of the assist force to the steering mechanism 20 is stopped. The performance of the gradual reduction processing is based on the concept that stopping the supply of the assist force is preferable when the abnormal state lasts for the predetermined period ΔT. Since the assist controlled variable $I_{as}$* gradually decreases, the assist force gradually decreases accordingly. Thus, a sudden change in steering feel is avoidable when the supply of the assist force to the steering mechanism 20 is stopped. Safety is also improved.

The same is true for when the assist controlled variable $I_{as}$* is greater than the upper limit $I_{UL}$*. Specifically, when the assist controlled variable $I_{as}$* remains limited for the predetermined period ΔT, the microcomputer 42 gradually reduces the upper limit $I_{UL}$* to "0".

The gradual reduction processing is forcibly performed regardless of the processing of calculating the upper limit $I_{UL}$* and the lower limit $I_{LL}$*. The microcomputer 42 may stop performing the gradual reduction processing when the assist controlled variable $I_{as}$* returns to a value within the normal range between the upper limit $I_{UL}$* and the lower limit $I_{LL}$* inclusive, during the performance of the gradual reduction processing. In this case, the upper limit $I_{UL}$* or the lower limit $I_{LL}$* that is forcibly gradually reduced to "0" returns to an original value thereof.

Next, the operation and effect of the ECU 40 when the ECU 40 performs the virtual end control are described. When the steering angle θs reaches the threshold angle ±$θ_{th}$ through the operation of the steering wheel 21 by a driver, the microcomputer 42 performs the virtual end control to suppress a further turning operation of the steering wheel 21 (i.e., to suppress an operation of the steering wheel 21 in a direction that increases the absolute value of the steering angle θs). The performance of the virtual end control causes the assist torque (the assist force) that is generated by the motor 31 to sharply decrease or causes the motor 31 to generate the steering reaction torque, so that the steering torque τ sharply increases. Thus, after the steering angle θs reaches the threshold angle ±$θ_{th}$, it is hard for a driver to turn the steering wheel 21 further. This makes a driver virtually feel that the rack end hits against the housing 27, thus virtually limiting the operation range of the steering wheel 21 to a range that is narrower than the physical range of operation of the steering wheel 21.

For some reasons, the calculated virtual end controlled variable $I_c$* may be so excessive as to have an abnormal value. In such a case, the final assist controlled variable $I_{as}$* that is calculated by adding the abnormal virtual end controlled variable $I_c$* to the original assist controlled variable $I_{as}$* may also have an abnormal value.

In this regard, according to the first embodiment, the individual limits ($I_{UL3-2}$*, $I_{LL3-2}$*) on the virtual end controlled variable $I_c$* are calculated on the basis of the sixth limit map M6. The individual limits on the virtual end controlled variable $I_c$* are taken into account to calculate the final limits ($I_{UL}$*, $I_{LL}$*) on the assist controlled variable $I_{as}$*. As a result, the final limits ($I_{UL}$*, $I_{LL}$*) become appropriate for the final assist controlled variable $I_{as}$* that reflects the virtual end controlled variable $I_c$*. Thus, even when the calculated assist controlled variable $I_{as}$* has an abnormal value due to the abnormal virtual end controlled variable $I_c$*, the abnormal calculated assist controlled variable $I_{as}$* is appropriately limited by the final limits ($I_{UL}$*, $I_{LL}$*) that reflect the individual limits ($I_{UL3-2}$*, $I_{LL3-2}$*) on the virtual end controlled variable $I_c$*. The final assist controlled variable $I_{as}$* that reflects the virtual end controlled variable $I_c$* that is normal is not mistakenly limited, and thus is more appropriately limited. Since the assist controlled variable $I_{as}$* that is limited to an appropriate value as described above is supplied as the final current command value I* to the motor control signal generator 62, the likelihood of unexpected torque (the assist torque or the steering reaction force torque) being supplied to the steering mechanism 20 is reduced.

The following describes the technical advantages of switching the individual limits ($I_{UL1}$*, $I_{LL1}$*) corresponding to the steering torque τ between the present value and the previous value on the basis of the value of the flag F.

When the virtual end control is not performed, the value of the flag F is set to "0". In this case, the present limits ($I_{UL1}$*, $I_{LL1}$*) calculated by the steering torque-sensitive limiters 91 and 101 are used to calculate the final limits ($I_{UL}$*, $I_{LL}$*). The assist controlled variable $I_{as}$* is limited by the final limits ($I_{UL}$*, $I_{LL}$*). In this case, the virtual end controlled variable $I_c$* is "0". As a result, the value of the assist controlled variable $I_{as}$* corresponds to the present steering operation state without being forcibly reduced or reversed in sign. The present individual limits ($I_{UL1}$*, $I_{LL1}$*) calculated by the steering torque-sensitive limiters 91 and 101, and, by extension, the present final limits ($I_{UL}$*, $I_{LL}$*) that reflect the present individual limits are also calculated to correspond to the present steering operation state. Thus, the variation range of the assist controlled variable $I_{as}$* limited by the present individual limits ($I_{UL1}$*, $I_{LL1}$*) calculated by the steering torque-sensitive limiters 91 and 101, and, by extension, the variation range of the assist controlled variable $I_{as}$* limited by the present final limits ($I_{UL}$*, $I_{LL}$*) are not extended unnecessarily relative to the assist controlled variable $I_{as}$*.

The virtual end control is performed when the steering angle θs reaches the first value (the threshold angle ±$θ_{th}$)

close to the second value that defines the boundaries of the maximum physical range of operation of the steering wheel 21. During performance of the virtual end control, the original assist controlled variable $I_{as}$ corresponding to the steering operation state is reduced or reversed in sign in accordance with the virtual end controlled variable $I_c^*$, so that the steering torque τ detected by the torque sensor 53 is likely to have a larger value. This may excessively extend, relative to the assist controlled variable $I_{as}^*$ that is reduced or reversed in sign through performance of the virtual end control, the variation range of the assist controlled variable $I_{as}^*$ limited by the individual limits ($I_{UL1}^*$, $I_{LL1}^*$) corresponding to the steering torque τ, and, by extension, the variation range of the assist controlled variable $I_{as}^*$ limited by the final limits ($I_{UL}^*$, $I_{LL}^*$) that reflect the individual limits.

In this regard, according to the first embodiment, during performance of the virtual end control, i.e., when the value of the flag F is "1", the previous upper limit $I_{UL1}^*$ held by the upper limit holder 97 and the previous lower limit $I_{LL1}^*$ held by the lower limit holder 107 are used as the individual limits corresponding to the steering torque τ, instead of the present limits ($I_{UL1}^*$, $I_{LL1}^*$) calculated by the steering torque-sensitive limiters 91 and 101. The previous upper limit $I_{UL1}^*$ and the previous lower limit $I_{LL1}^*$ are respectively calculated by the steering torque-sensitive limiters 91 and 101 immediately before the virtual end control is performed, i.e., before the steering torque τ is increased through performance of the virtual end control. Thus, the variation range of the assist controlled variable $I_{as}^*$ limited by the previous limits ($I_{UL1}^*$, $I_{LL1}^*$) is narrower than the variation range of the assist controlled variable $I_{as}^*$ limited by the present limits ($I_{UL1}^*$, $I_{LL1}^*$). This reduces the likelihood that when the steering torque τ is increased through performance of the virtual end control, the variation range of the assist controlled variable $I_{as}^*$ limited by the individual limits ($I_{UL1}^*$, $I_{LL1}^*$) corresponding to the steering torque τ is excessively extended. Accordingly, the likelihood is reduced that when the assist controlled variable $I_{as}^*$ is reduced or reversed in sign through performance of the virtual end control, the variation range of the assist controlled variable $I_{as}^*$ limited by the final limits ($I_{UL}^*$, $I_{LL}^*$) that reflect the individual limits ($I_{UL1}^*$, $I_{LL1}^*$) is extended excessively relative to the assist controlled variable $I_{as}^*$.

This allows the ECU 40 to appropriately fulfill the function to limit the assist controlled variable $I_{as}^*$ having an abnormal value, even when the ECU 40 has the function to perform the virtual end control. For example, when the calculated assist controlled variable $I_{as}^*$ is so excessive as to have an abnormal value during performance of the virtual end control, the abnormal assist controlled variable $I_{as}^*$ is limited more appropriately. Thus, a large change in motor torque or the occurrence of self-steering is reduced. Safety is also improved.

When performance of the virtual end control is stopped, i.e., when the value of the flag F changes from "1" to "0", the individual limits ($I_{UL1}^*$, $I_{LL1}^*$) that are used to calculate the final limits ($I_{UL}^*$, $I_{LL}^*$) switch from the individual limits held by the upper limit holder 97 and the lower limit holder 107 to the present limits calculated by the steering torque-sensitive limiters 91 and 101.

Next, a steering control unit according to a second embodiment is described. According to the first embodiment, the steering angle-sensitive limiters 93 and 103 use different (i.e., two) maps (M3, M6) to calculate the respective limits values ($I_{UL3}^*$, $I_{LL3}^*$) in accordance with the steering angle θs. In contrast, according to the second embodiment, the steering angle-sensitive limiters 93 and 103 use an identical (i.e., single) seventh limit map M7 illustrated by a graph in FIG. 15 to calculate the respective limits values ($I_{UL3}^*$, $I_{LL3}^*$) in accordance with the steering angle θs.

Figure 15:
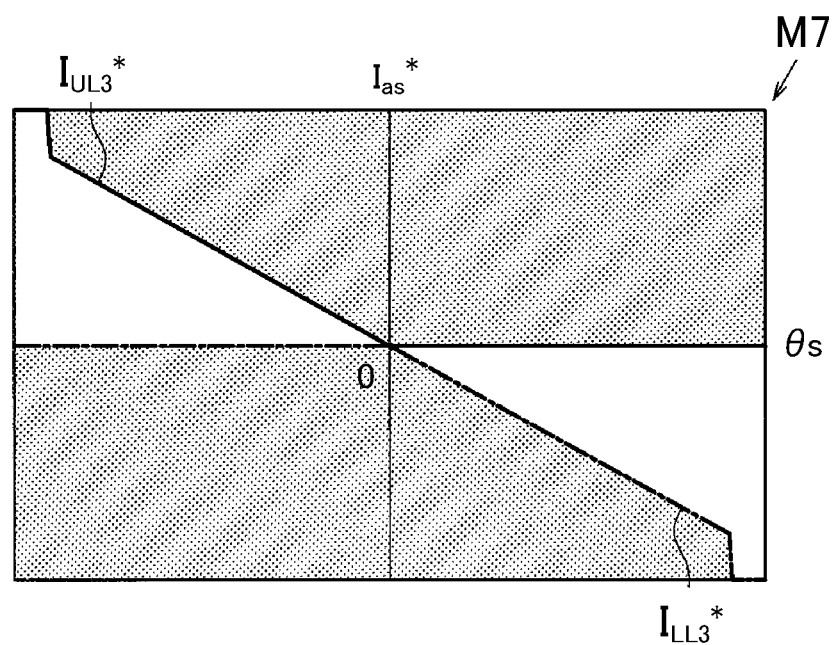
FIG. 15 is a map, used in a steering control unit according to a second embodiment, illustrating another example of the relationship between the steering angle and the limits.

As illustrated by the graph in FIG. 15, the seventh limit map M7 has characteristics that are obtained by performing a logical OR between the limits ($I_{UL3-1}^*$, $I_{LL3-1}^*$) defined by the third limit map M3 and the limits ($I_{UL3-2}^*$, $I_{LL3-2}^*$) defined by the sixth limit map M6. In other words, the seventh limit map M7 is set by modifying the characteristics of the third limit map M3 by taking into account the virtual end controlled variable $I_c^*$ that is calculated by the virtual end controller 87. The individual limits ($I_{UL3}^*$, $I_{LL3}^*$), defined by the seventh limit map M7, corresponding to the steering angle θs reflect the individual limits ($I_{UL3-2}^*$, $I_{LL3-2}^*$) on the virtual end controlled variable $I_c^*$.

Thus, this approach appropriately calculates the individual limits ($I_{UL3}^*$, $I_{LL3}^*$) in accordance with the steering angle θs while taking into account the virtual end controlled variable $I_c^*$. Further, this makes it possible to eliminate, from each of the steering angle-sensitive limiters 93 and 103, the adder (93c, 103c) and either the first calculator (93a, 103a) or the second calculator (93b, 103b). As such, the structures of the steering angle-sensitive limiters 93 and 103 are simplified. Using the seventh limit map M7 eliminates the need to add together the result calculated by the first calculator (93a, 103a) and the result calculated by the second calculator (93b, 103b). This makes it easy to calculate the individual limits ($I_{UL3}^*$, $I_{LL3}^*$) in accordance with the steering angle θs.

Next, a steering control unit according to a third embodiment is described. According to the first embodiment, the steering angle-sensitive limiters 93 and 103 calculate, in accordance with the steering angle θs, both the individual limits ($I_{UL3-1}^*$, $I_{LL3-1}^*$) on the assist controlled variable $I_{as}^*$ and the individual limits ($I_{UL3-2}^*$, $I_{LL3-2}^*$) on the virtual end controlled variable $I_c^*$. In contrast, according to the third embodiment, the individual limits ($I_{UL3-1}^*$, $I_{LL3-1}^*$) on the assist conttolled variable $I_{as}^*$ and the individual limits ($I_{UL3-2}^*$, $I_{LL3-2}^*$) on the virtual end controlled variable $I_c^*$ are calculated by different calculators.

Figure 16:
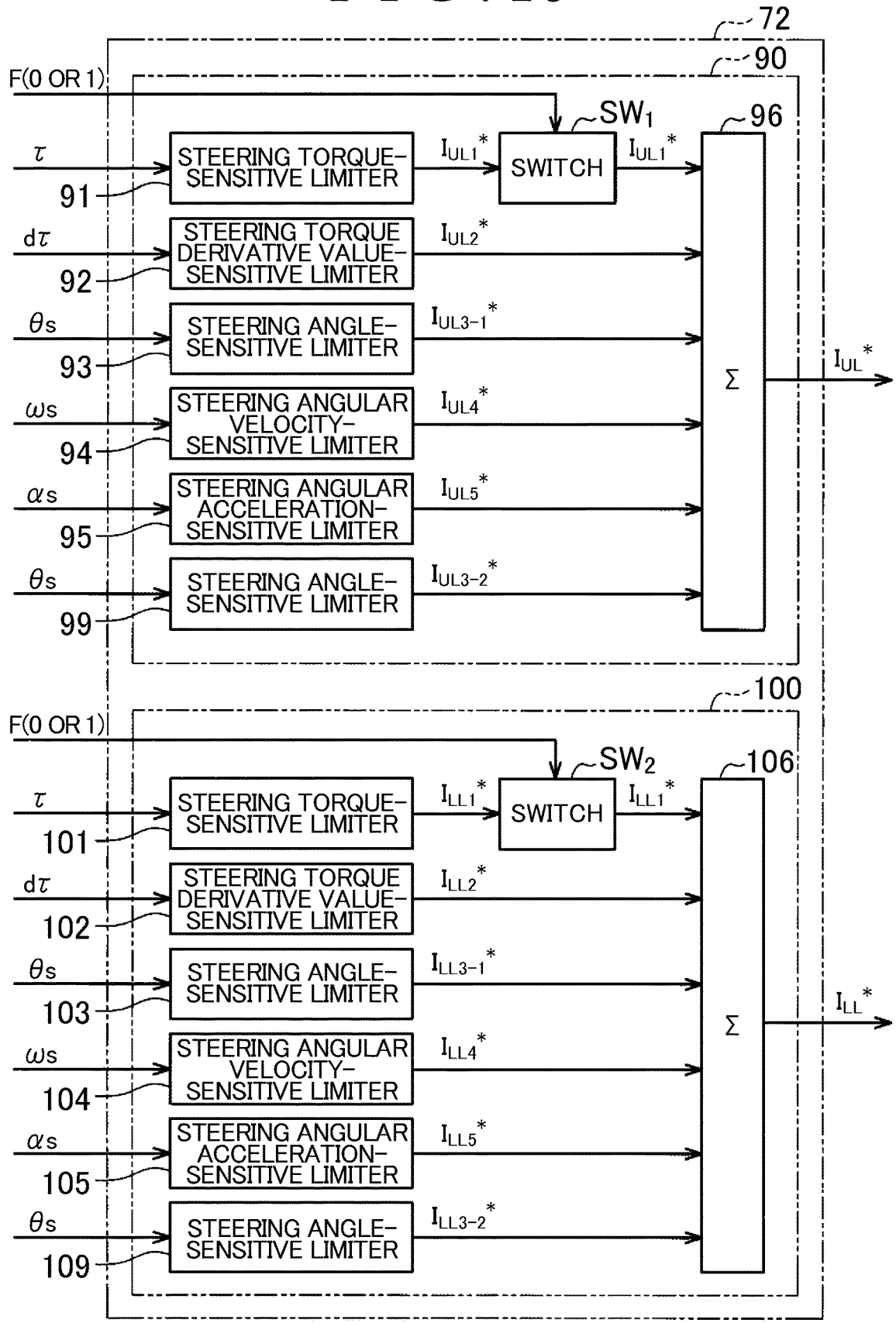
FIG. 16 is a control block diagram of an upper and lower limit calculator in a steering control unit according to a third embodiment.

As illustrated in FIG. 16, the upper limit calculator 90 includes two steering angle-sensitive limiters: the steering angle-sensitive limiter 93; and a steering angle-sensitive limiter 99 for virtual end controlled variable. The lower limit calculator 100 includes two steering angle-sensitive limiters: the steering angle-sensitive limiter 103; and a steering angle-sensitive limiter 109 for virtual end controlled variable.

The steering angle-sensitive limiters 93 and 103 use the third limit map M3 illustrated by the graph in FIG. 3 to calculate their respective individual limits ($I_{UL3-1}^*$, $I_{LL3-1}^*$) on the assist controlled variable $I_{as}^*$ in accordance with the steering angle θs. The respective individual limits ($I_{UL3-1}^*$, $I_{LL3-1}^*$) calculated on the basis of the third limit map M3 are fed to the adders 96 and 106.

The steering angle-sensitive limiters 99 and 109 use the sixth limit map M6 illustrated by the graph in FIG. 13 to calculate their respective individual limits ($I_{UL3-2}^*$, $I_{LL3-2}^*$) on the virtual end controlled variable $I_c^*$ in accordance with the steering angle θs. The respective individual limits ($I_{UL3-2}^*$, $I_{LL3-2}^*$) calculated on the basis of the sixth limit map M6 are fed to the adders 96 and 106.

As a result, the final limits ($I_{UL}^*$, $I_{LL}^*$) on the assist controlled variable $I_{as}^*$ reflect both the individual limits ($I_{UL3-1}^*$, $I_{LL3-1}^*$), corresponding to the steering angle θs, on the assist controlled variable $I_{as}*$, and the individual limits ($I_{UL3-2}*$, $I_{LL3-2}*$), corresponding to the steering angle θs, on the virtual end controlled variable $I_c*$. Thus, even when the calculated virtual end controlled variable $I_c*$ is so excessive as to have an abnormal value, the assist controlled variable $I_{as}*$ is appropriately limited.

The embodiments described above may be modified in various ways, for example, as follows. According to the embodiments, the virtual end controller 87 is included in the assist controller 71. Alternatively, the virtual end controller 87 and the assist controller 71 may be provided as separate elements in such a manner that the virtual end controlled variable $I_c*$ calculated by the virtual end controller 87 is added to the assist controlled variable $I_{as}*$ calculated by the assist controller 71.

According to the embodiments, the ECU 40 is used for an electric power steering system that supplies an assist force to the steering shaft 22. Alternatively, the ECU 40 may be used for an electric power steering system that supplies an assist force to the rack shaft 23.

The invention makes it possible to appropriately limit an excessive assist controlled variable having an abnormal value.

What is claimed is:

1. A steering control unit comprising;
    an assist controller that calculates an assist controlled variable on the basis of a plurality of kinds of state quantities including a steering torque and a steering angle, the assist controlled variable being used to control power supply to a motor that generates an assist force to be supplied to a steering mechanism of a vehicle;
    a correction controller that performs, when the steering angle reaches a first value close to a second value that defines a boundary of a physical range of operation of a steering wheel that is included in the steering mechanism, correction control that calculates a correction quantity that corrects the assist controlled variable to sharply increase the steering torque;
    a limit calculator that sets first limits individually for each of the plurality of kinds of state quantities, each of the first limits being used to limit a variation range of the assist controlled variable in accordance with a corresponding one of the plurality of kinds of state quantities, the limit calculator being configured to calculate a final limit on the assist controlled variable by adding together all the first limits; and
    a limit processor that limits the variation range of the assist controlled variable on the basis of the final limit calculated by the limit calculator, wherein
    the limit calculator sets a second limit that limits the correction quantity in accordance with the steering angle, and calculates the final limit by taking into account the second limit, and when the correction control is performed, the limit calculator calculates the final limit by using the first limit that corresponds to the steering torque immediately before the correction control is performed.

2. The steering control unit according to claim 1, wherein the limit calculator includes a holder and a switcher,
    each time the first limit corresponding to the steering torque is used, the holder holds the used first limit corresponding to the steering torque, and
    the switcher switches, in accordance with whether the correction control is performed, the first limit that corresponds to the steering torque and that is to be used to calculate the final limit, between a present value and a previous value, the present value being calculated in a present calculation cycle, the previous value being calculated in a previous calculation cycle and held by the holder.

3. The steering control unit according to claim 1, wherein
    the correction controller sets a value of a flag in accordance with whether the correction control is performed, and
    the limit calculator recognizes, on the basis of the value of the flag, whether the correction control is performed.

4. The steering control unit according to claim 1, wherein
    the limit calculator includes a steering angle-sensitive calculator,
    the steering angle-sensitive calculator includes a first calculator, a second calculator, and a third calculator,
    the first calculator calculates the first limit corresponding to the steering angle in accordance with the steering angle,
    the second calculator calculates the second limit in accordance with the steering angle, and
    the third calculator calculates a final individual limit corresponding to the steering angle by adding together the first limit calculated by the first calculator and the second limit calculated by the second calculator.

5. The steering control unit according to claim 1, wherein
    the limit calculator includes a plurality of state quantity-sensitive calculators and a final limit calculator,
    the state quantity-sensitive calculators calculate the first limits on the assist controlled variable in accordance with the plurality of kinds of state quantities,
    the final limit calculator calculates the final limit on the assist controlled variable by adding together all the first limits calculated by the state quantity-sensitive calculators,
    the state quantity-sensitive calculators include a first steering angle-sensitive calculator and a second steering angle-sensitive calculator,
    the first steering angle-sensitive calculator calculates the first limit corresponding to the steering angle in accordance with the steering angle, and
    the second steering angle-sensitive calculator calculates the second limit in accordance with the steering angle.

6. The steering control unit according to claim 1, wherein
    the limit calculator includes a steering angle-sensitive calculator that calculates the first limit corresponding to the steering angle on the basis of a map that defines a relationship between the steering angle and the first limit corresponding to the steering angle, and
    the first limit defined in the map is set by taking into account the correction quantity.

\* \* \* \* \*